US012142854B2

(12) United States Patent
Wang et al.

(10) Patent No.: US 12,142,854 B2
(45) Date of Patent: Nov. 12, 2024

(54) ANTENNA STRUCTURE AND ELECTRONIC DEVICE

(71) Applicants: Beijing BOE Technology Development Co., Ltd., Beijing (CN); BOE Technology Group Co., Ltd., Beijing (CN)

(72) Inventors: Yali Wang, Beijing (CN); Feng Qu, Beijing (CN); Biqi Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 451 days.

(21) Appl. No.: 17/635,703

(22) PCT Filed: Apr. 19, 2021

(86) PCT No.: PCT/CN2021/088050
§ 371 (c)(1),
(2) Date: Feb. 16, 2022

(87) PCT Pub. No.: WO2022/221983
PCT Pub. Date: Oct. 27, 2022

(65) Prior Publication Data
US 2023/0344132 A1 Oct. 26, 2023

(51) Int. Cl.
*H01Q 5/364* (2015.01)
*H01Q 9/04* (2006.01)
*H01Q 1/22* (2006.01)

(52) U.S. Cl.
CPC .......... *H01Q 9/045* (2013.01); *H01Q 9/0421* (2013.01); *H01Q 1/22* (2013.01)

(58) Field of Classification Search
CPC ........ H01Q 9/045; H01Q 9/0421; H01Q 1/22; H01Q 1/243; H01Q 5/364; H01Q 9/0457
See application file for complete search history.

(56) References Cited

U.S. PATENT DOCUMENTS 9,705,195 B2 * 7/2017 Hashimoto .............. H01Q 1/38
2003/0214445 A1 * 11/2003 Hsiao ........................ H01Q 1/38 343/700 MS
2021/0028548 A1 * 1/2021 Tsutsumi ............. H01Q 21/065

* cited by examiner

*Primary Examiner* — Minh D A
(74) *Attorney, Agent, or Firm* — Ling Wu; Stephen Yang; Ling and Yang Intellectual Property

(57) ABSTRACT

An antenna structure includes a first substrate and a second substrate. There is a dielectric layer between the first substrate and the second substrate. The first substrate includes a first dielectric substrate, and a radiation patch and a micro-strip arranged on the first dielectric substrate. The radiation patch and the micro-strip are on one side of the first dielectric substrate away from the second substrate. Orthographic projections of the micro-strip and the radiation patch on the first dielectric substrate do not overlap. The radiation patch has at least one first slot away from the micro-strip. The second substrate includes a second dielectric substrate, a feed structure arranged on one side of the second dielectric substrate close to the first substrate, and a ground layer arranged on one side of the second dielectric substrate away from the first substrate. The feed structure is electrically connected to the micro-strip.

20 Claims, 12 Drawing Sheets

ANTENNA STRUCTURE AND ELECTRONIC DEVICE

CROSS-REFERENCE TO RELATED APPLICATIONS

The present application is a U.S. National Phase Entry of International Application PCT/CN2021/088050 having an international filing date of Apr. 19, 2021. The entire contents of the above-identified application are hereby incorporated by reference.

TECHNICAL FIELD

The present disclosure relates, but is not limited to, the technical field of communication, and in particular to an antenna structure and an electronic device.

BACKGROUND

As an important constituent part of mobile communication, research and design of an antenna play a vital role in mobile communication. However, the biggest change brought by the fifth generation (5G) mobile communication technology is innovation of user experience, and signals in a terminal device directly affects the user experience, therefore a design of an antenna of a 5G terminal will become an important link of 5G deployment.

SUMMARY

The following is a summary of subject matters described herein in detail. This summary is not intended to limit the scope of protection of claims.

Embodiments of the present disclosure provide an antenna structure and an electronic device.

In an aspect, an embodiment of the present disclosure provides an antenna structure, including a first substrate and a second substrate. A dielectric layer is provided between the first substrate and the second substrate. The first substrate includes: a first dielectric substrate, and a radiation patch and a micro-strip which are arranged on the first dielectric substrate. The radiation patch and the micro-strip are on one side of the first dielectric substrate away from the second substrate. Orthographic projections of the micro-strip and the radiation patch on the first dielectric substrate do not overlap with each other, and the radiation patch has at least one first slot away from the micro-strip. The second substrate includes: a second dielectric substrate, a feed structure arranged on one side of the second dielectric substrate close to the first substrate, and a ground layer arranged on one side of the second dielectric substrate away from the first substrate. The feed structure is electrically connected to the micro-strip.

In some exemplary implementation modes, the radiation patch is configured to introduce two resonant frequency points and one zero radiation point between the two resonant frequency points. The feed structure is configured to introduce two zero radiation points.

In some exemplary implementation modes, the radiation patch has a first edge and a second edge in a first direction. The second edge is adjacent to the micro-strip. The first edge is away from the micro-strip. A distance between the first slot and the first edge is less than a distance between the first slot and the second edge. The first slot extends in a second direction, and the first direction intersects with the second direction.

In some exemplary implementation modes, in a plane parallel to the first substrate, the radiation patch has a notch at the second edge, and at least part of the micro-strip is in the notch of the radiation patch.

In some exemplary implementation modes, the micro-strip is electrically connected to the feed structure through a conductive post.

In some exemplary implementation modes, the conductive post is in direct contact with the micro-strip and in direct contact with the feed structure.

In some exemplary implementation modes, the feed structure includes: a feed main body, a first branch, and a second branch. The antenna structure has a central axis in the first direction. The feed main body is on the central axis. The first branch and the second branch are symmetrically connected to two sides of the feed main body with respect to the central axis.

In some exemplary implementation modes, the first branch includes: a first feed branch and a first open-circuit branch. The first open-circuit branch is electrically connected to the first feed branch, and the first open-circuit branch is on one side of the first feed branch away from the feed main body. The second branch includes: a second feed branch and a second open-circuit branch. The second open-circuit branch is electrically connected to the second feed branch, and the second open-circuit branch is on one side of the second feed branch away from the feed main body.

In some exemplary implementation modes, the first open-circuit branch and the second open-circuit branch are straight line segments parallel to the central axis.

In some exemplary implementation modes, the first open-circuit branch and the second open-circuit branch are L-shaped.

In some exemplary implementation modes, the first branch further includes: a first short-circuit branch. The first short-circuit branch is on one side of the first feed branch away from the first open-circuit branch. The second branch further includes: a second short-circuit branch. The second short-circuit branch is on one side of the second feed branch away from the second open-circuit branch. The first short-circuit branch and the second short-circuit branch are symmetrical with each other with respect to the central axis. The first short-circuit branch is electrically connected to the feed main body and the first feed branch. The second short-circuit branch is electrically connected to the feed main body and the second feed branch.

In some exemplary implementation modes, the main body includes: a first feed main body and a second feed main feed main body which are connected sequentially. The first feed branch and the second feed branch are symmetrically connected to two sides of the first feed main body with respect to the central axis. The first branch further includes: a third short-circuit branch. The third short-circuit branch is on one side of the first feed branch close to the second feed main body. The second branch further includes: a fourth short-circuit branch. The fourth short-circuit branch is on one side of the second feed branch close to the second feed main body. The third short-circuit branch and the fourth short-circuit branch are symmetrical with respect to the central axis. The third short-circuit branch is connected to the second feed main body and the first feed branch. The fourth short-circuit branch is connected to the second feed main body and the second feed branch.

In some exemplary implementation modes, the second feed main body is electrically connected to the micro-strip. A width of the first feed main body is greater than a width of the second feed main body.

In some exemplary implementation modes, an extension length of the first short-circuit branch is greater than an extension length of the third short-circuit branch.

In some exemplary implementation modes, the third short-circuit branch and the fourth short-circuit branch are L-shaped.

In some exemplary implementation modes, the first short-circuit branch and the second short-circuit branch are L-shaped.

In some exemplary implementation modes, the radiation patch further has a second slot. The second slot is on one side of the first slot close to the micro-strip.

In some exemplary implementation modes, an extension direction of the second slot is parallel to that of the first slot, and a length of the second slot in the extension direction is less than a length of the first slot in the extension direction.

In some exemplary implementation modes, the radiation patch is connected to a ground layer through a short-circuit pin. The short-circuit pin is close to the micro-strip.

In some exemplary implementation modes, orthographic projections of the radiation patch and the feed structure on the first dielectric substrate do not overlap with each other.

In another aspect, an embodiment of the present disclosure provides an electronic device, including the antenna structure as described above.

Other aspects may be understood upon reading and understanding of the accompanying drawings and detailed descriptions.

BRIEF DESCRIPTION OF DRAWINGS

Accompanying drawings are used to provide further understanding of technical solutions of the present disclosure, constitute a part of the specification, and are used to explain the technical solutions of the present disclosure together with the embodiments of the present disclosure, but do not constitute a limitation on the technical solutions of the present disclosure. Shapes and sizes of one or more components in the accompanying drawings do not reflect actual scales and are only intended to illustrate the contents of the present disclosure.

DETAILED DESCRIPTION

Figure 1A:
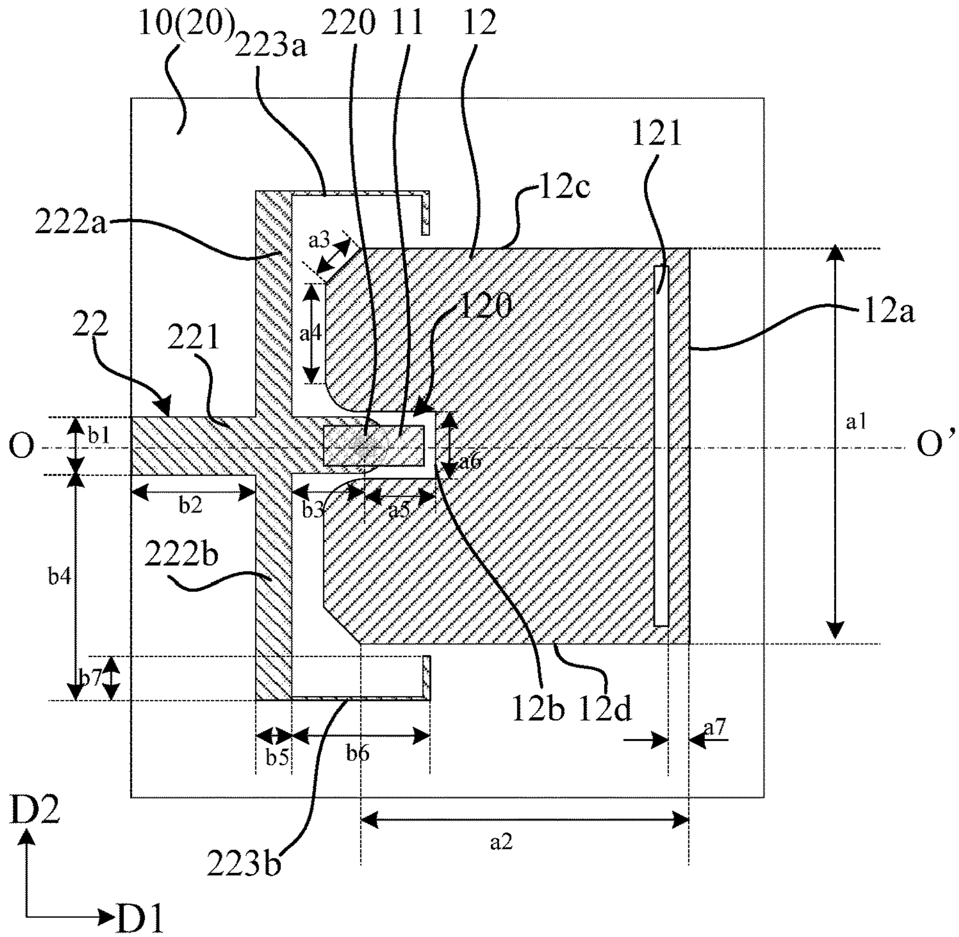
FIG. 1A illustrates a plane schematic diagram of an antenna structure of at least one embodiment of the present disclosure.

The embodiments of the present disclosure will be described in detail below with reference to the accompanying drawings. Implementation modes may be implemented in multiple different forms. It will be readily appreciated by those of ordinary skills in the art that the implementation modes and contents may be changed into one or more forms without departing from the essence and scope of the present disclosure. Therefore, the present disclosure should not be construed as only being limited to the contents recorded in the following embodiments. The embodiments in the present disclosure and the features in the embodiments may be combined randomly with each other if there is no conflict.

In the accompanying drawings, a size of a constituent element and a thickness or area of a layer are sometimes exaggerated for clarity. Therefore, one implementation mode of the present disclosure is not necessarily limited to the sizes, and the shapes and sizes of multiple components in the accompanying drawings do not reflect actual scales. In addition, the accompanying drawings schematically show an ideal example, and one mode of the present disclosure is not limited to the shape, value, or the like shown in the accompanying drawings.

Ordinal numerals such as “first”, “second” and “third” in the present disclosure are set to avoid confusion between constituent elements, but are not intended to provide limitations in terms of quantity. “A plurality of/multiple” in the present disclosure means a quantity of two or more.

In the present disclosure, for convenience, wordings indicating orientations or positional relationships, such as “center”, “upper”, “lower”, “front”, “back”, “vertical”, “horizontal", "top", "bottom", "inside", "outside", and the like are used to describe the positional relationships of the constituent elements with reference to the accompanying drawings, and are merely for facilitating describing the present specification and simplifying the description, rather than indicating or implying that the referred apparatuses or elements must have particular orientations, and be constructed and operated in particular orientations. Thus, they cannot be construed as a limitation to the present disclosure. The positional relationships between the constituent elements appropriately change according to the directions according to which the constituent elements are described. Therefore, they are not limited to the words and sentences described in the specification, and can be replaced appropriately according to the situations.

In the present disclosure, unless otherwise specified and defined explicitly, terms "mount", "mutually connect", "connect" and the like should be understood in a broad sense. For example, the terms may refer to fixed connection, or detachable connection, or integration. The terms may refer to mechanical connection or electrical connection. The terms may refer to direct mutual connection, may also refer to indirect connection through a medium, and may refer to internal communication between two components. For those of ordinary skills in the art, the meanings of the abovementioned terms in the present disclosure may be understood according to situations.

In the present disclosure, "electrical connection" includes a situation that constituent elements are connected together by an element with a certain electrical effect. There is no specific restriction on "the element with certain electrical effect" as long as it can transmit electrical signals between connected constituent elements. Examples of "the elements with some electrical effects" not only include electrodes and wiring, but also include switching elements, such transistors, resistors, inductors, capacitors, or other elements with one or more other functional, etc.

In the present disclosure, "parallel" refers to a state in which an angle formed by two straight lines is above −10° and below 10°. Therefore, it can include the state in which the angle is above −5° and below 5°. In addition, "perpendicular" refers to a state in which an angle formed by two straight lines is above 80° and below 100°. Therefore, it can include the state in which the angle is above 85° and below 95°.

"About" used in the embodiments of the present disclosure refer to values within an allowable process and measurement error range without strictly restricting a limit.

In the present disclosure, a Micro-strip (MS) refers to a microwave transmission line composed of a single conductor strip supported on a dielectric substrate.

At least one embodiment of the present disclosure provides an antenna structure, including a first substrate and a second substrate. A dielectric layer is provided between the first substrate and the second substrate. The first substrate includes: a first dielectric substrate, and a radiation patch and a micro-strip arranged on the first dielectric substrate. The radiation patch and the micro-strip are on one side of the first dielectric substrate away from the second substrate. Orthographic projections of the micro-strip and the radiation patch on the first dielectric substrate do not overlap. The radiation patch has at least one first slot away from the micro-strip. The second substrate includes: a second dielectric substrate, a feed structure arranged on one side of the second dielectric substrate close to the first substrate, and a ground layer arranged on one side of the second dielectric substrate away from the first substrate. The feed structure is electrically connected to the micro-strip.

In some exemplary implementation modes, the radiation patch is configured to introduce two resonant frequency points and one zero radiation point between the two resonant frequency points. The feed structure is configured to introduce two zero radiation points.

In this embodiment, a first slot is formed in the radiation patch to introduce two resonant frequency points, one zero radiation point is generated between the two resonant frequency points, and two zero radiation points are introduced by using the feed structure, so that a dual-band pass filter antenna structure is implemented. The antenna structure of this embodiment may be used to n77 and n79 frequency bands in 5G without significantly increasing a profile of the antenna or introducing additional discrete devices, which can avoid large insertion loss. Moreover, the antenna structure of this embodiment can achieve high pass band selectivity and good out-of-band rejection characteristics.

In some exemplary implementation modes, the dielectric layer may include gas with a single-component, or mixed gas with multiple components, or air. For example, the dielectric layer may be an air layer. However, this embodiment is not limited thereto. The dielectric layer may include other dielectrics with a low dielectric constant.

In some exemplary implementation modes, the radiation patch has a first edge and a second edge in a first direction. The second edge is adjacent to the micro-strip. The first edge is away from the micro-strip. A distance between the first slot and the first edge is less than a distance between the first slot and the second edge. The first slot extends in a second direction, wherein the first direction intersects with the second direction. For example, the first direction is perpendicular to the second direction.

In some examples, an orthographic projection of the micro-strip on the first dielectric substrate may be a rectangle. However, this embodiment is not limited thereto.

In some exemplary implementation modes, in a plane parallel to the first substrate, the radiation patch has a notch at the second edge, and at least part of the micro-strip is in the notch of the radiation patch. In this embodiment, the notch is formed by recessing the second edge of the radiation patch towards the first slot. In some examples, one end of the micro-strip may extend into the notch of the radiation patch, so that a part of the micro-strip is in the notch. Or, in some examples, the micro-strip is entirely in the notch of the radiation patch. However, this embodiment is not limited thereto.

In some exemplary implementation modes, the micro-strip is electrically connected to the feed structure through a conductive post. In some examples, an orthographic projection of the conductive post on the first dielectric substrate is within an orthographic projection of the notch of the radiation patch on the first dielectric substrate.

In some exemplary implementation modes, the conductive post is in direct contact with the micro-strip and in direct contact with the feed structure. In some examples, the conductive post may be in direct contact with a surface of the micro-strip close to the first dielectric substrate, and is in direct contact with a surface of the feed structure away from the second dielectric substrate. However, this embodiment is not limited thereto. In some examples, a via may be formed in the feed structure, and the conductive post may be inserted into the via of the feed structure to achieve electrical contact with the feed structure.

In some exemplary implementation modes, the feed structure includes: a feed main body, a first branch, and a second branch. The antenna structure has a central axis in the first direction. The feed main body is on the central axis. The first branch and the second branch are symmetrically connected to two sides of the feed main body with respect to the central axis.

In some exemplary implementation modes, the first branch includes: a first feed branch and a first open-circuit branch. The first open-circuit branch is electrically connected to the first feed branch, and the first open-circuit branch is on one side of the first feed branch away from the feed main body. The second branch includes: a second feed branch and a second open-circuit branch. The second open-circuit branch is electrically connected to the second feed branch, and the second open-circuit branch is on one side of the second feed branch away from the feed main body. In this embodiment, the first feed branch and the second feed branch are symmetrical with each other with respect to the central axis, and the first open-circuit branch and the second open-circuit branch are symmetrical with each other with respect to the central axis.

In some exemplary implementation modes, the first open-circuit branch and the second open-circuit branch are straight line segments parallel to the central axis, or are L-shaped. However, this embodiment is not limited thereto.

In some exemplary implementation modes, the first branch includes: a first feed branch, a first open-circuit branch, and a first short-circuit branch. The second branch includes: a second feed branch, a second open-circuit branch, and a second short-circuit branch. The first short-circuit branch is on one side of the first feed branch away from the first open-circuit branch. The second short-circuit branch is on one side of the second feed branch away from the second open-circuit branch. The first short-circuit branch and the second short-circuit branch are symmetrical with each other with respect to the central axis. The first short-circuit branch is electrically connected to the feed main body and the first feed branch. The second short-circuit branch is electrically connected to the feed main body and the second feed branch.

In some exemplary implementation modes, the feed main body includes: a first feed main body and a second feed main body which are sequentially electrically connected. The first feed branch and the second feed branch are symmetrically connected to two sides of the first feed main body with respect to the central axis. The first branch includes: a first feed branch, a first open-circuit branch, a first short-circuit branch, and a third short-circuit branch. The second branch includes: a second feed branch, a second open-circuit branch, a second short-circuit branch, and a fourth short-circuit branch. The third short-circuit branch is on one side of the first feed branch close to the second feed main body. The fourth short-circuit branch is on one side of the second feed branch close to the second feed main body. The third short-circuit branch and the fourth short-circuit branch are symmetrical with each other with respect to the central axis. The third short-circuit branch is connected to the second feed main body and the first feed branch. The fourth short-circuit branch is connected to the second feed main body and the second feed branch.

In some exemplary implementation modes, the second feed main body is electrically connected to the micro-strip. A width of the first feed main body is greater than that of the second feed main body. In the present disclosure, the width represents a length in a direction perpendicular to a wiring extension direction.

In some exemplary implementation modes, an extension length of the first short-circuit branch is greater than that of the third short-circuit branch. In the present disclosure, an extension length represents a length in the wiring extension direction. In this embodiment, an extension length of the second short-circuit branch is greater than that of the fourth short-circuit branch.

In some exemplary implementation modes, the third short-circuit branch and the fourth short-circuit branch may be L-shaped.

In some exemplary implementation modes, the first short-circuit branch and the second short-circuit branch may be L-shaped.

In some exemplary implementation modes, the radiation patch further has a second slot. The second slot is on one side of the first slot close to the micro-strip.

In some exemplary implementation modes, the extension direction of the second slot is parallel to that of the first slot, and the length of the second slot in the extension direction is less than that of the first slot in the extension direction.

In some exemplary implementation modes, the radiation patch is connected to a ground layer through a short-circuit pin. The short-circuit pin is close to the micro-strip. An orthogonal projection of the short-circuit pin on the first dielectric substrate is on one side, close to an orthogonal projection of the micro-strip on the first dielectric substrate, of an orthogonal projection of the first slot on the first dielectric substrate.

In some exemplary implementation modes, orthographic projections of the radiation patch and the feed structure on first dielectric substrate may not overlap.

The antenna structure of this embodiment is described in the following by multiple examples.

Figure 1B:
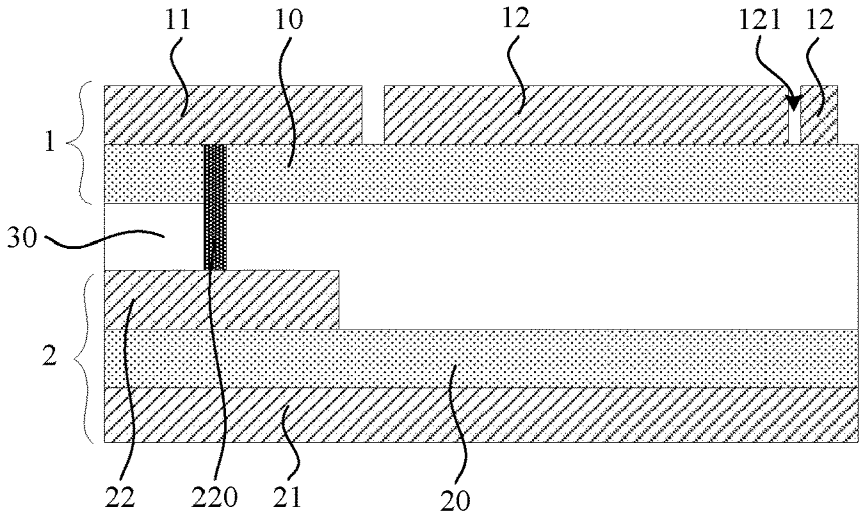
FIG. 1B illustrates a partial cross-sectional view of the antenna structure as shown in FIG. 1A along a central axis OO'.

FIG. 1A illustrates a plane schematic diagram of an antenna structure of at least one embodiment of the present disclosure. FIG. 1B illustrates a partial cross-sectional view of the antenna structure as shown in FIG. 1A along a central axis OO'. The central axis OO' is a central axis of the antenna structure in a second direction D2, wherein the central axis OO' is parallel to a first direction D1. The first direction D1 and the second direction D2 are in the same plane, and the first direction D1 is perpendicular to the second direction D2.

In some exemplary implementation modes, as shown in FIG. 1A and FIG. 1B, the antenna structure of this exemplary embodiment includes: a first substrate 1 and a second substrate 2. A dielectric layer 30 is provided between the first substrate 1 and the second substrate 2. For example, the dielectric layer 30 may be an air layer. In some examples, the first substrate 1 may be connected to the second substrate 2 through a support structure such as a bolt, so that the first substrate 1 is spaced from the second substrate 2 by a certain distance, thereby forming the dielectric layer 30. However, this embodiment is not limited thereto. For example, the first substrate 1 may be connected to the second substrate 2 by a frame sealing adhesive, so as to maintain a certain spacing distance.

In some exemplary implementation modes, as shown in FIG. 1A and FIG. 1B, the first substrate 1 includes: a first dielectric substrate 10, and a radiation patch 12 and a micro-strip 11 arranged on the first dielectric substrate 10. The radiation patch 12 and the micro-strip 11 are on one side of the first dielectric substrate 10 away from the second substrate 2. Orthographic projections of the radiation patch 12 and the micro-strip 11 on the first dielectric substrate 10 do not overlap. In this embodiment, the radiation patch 12 is adjacently coupled with the micro-strip 11. The radiation patch 12 has a first slot 121 away from the micro-strip 11. The first slot 121 away from the micro-strip 11 is formed in the radiation patch 12, so that two resonant frequency points may be introduced, and one zero radiation point is generated between the two resonant frequency points.

In some exemplary implementation modes, as shown in FIG. 1A and FIG. 1B, the second substrate 2 includes: a second dielectric substrate 20, a feed structure 22 arranged on one side of the second dielectric substrate 20 close to the first substrate 1, and a ground layer 21 arranged on one side of the second dielectric substrate 20 away from the first substrate 1. The feed structure 22 is electrically connected to the micro-strip 11. The micro-strip 11 serves as an excitation port to excite the radiation patch 12. The feed structure 22 may introduce two zero radiation points, which are respectively located at a high frequency band and a low frequency band. The antenna structure provided by this implementation mode may achieve dual-band pass filtering.

In some exemplary implementation modes, as shown in FIG. 1A, the first dielectric substrate 10 and the second dielectric substrate 20 may both be rectangles. For example, the first dielectric substrate 10 and the second dielectric substrate 20 may be rectangular plates with a same size, and projections of the two substrates on a horizontal plane may overlap. However, this embodiment is not limited thereto. For example, the first dielectric substrate 10 and the second dielectric substrate 20 may be non-rectangles, such as circles, pentagons, and the like. For another example, the shapes and the sizes of the first dielectric substrate 10 and the second dielectric substrate 20 may be different or the same.

In some exemplary implementation modes, as shown in FIG. 1A, the radiation patch 12 has a first edge 12*a* and a second edge 12*b* in a first direction D1, and has a third edge 12*c* and a fourth edge 12*d* in a second direction D2. Two ends of the first edge 12*a* are respectively connected to the third edge 12*c* and the fourth edge 12*d*. Two ends of the second edge 12*b* are respectively connected to the third edge 12*c* and the fourth edge 12*d*. The second edge 12*b* is adjacent to the micro-strip 11. The first edge 12*a* is away from the micro-strip 11. The first edge 12*a* is parallel to the second direction D2. The third edge 12*c* and the fourth edge 12*d* are parallel to the first direction D1.

In some exemplary implementation modes, as shown in FIG. 1A, the second edge 12*b* of the radiation patch 12 includes: a first broken line segment, a first arc segment, a second broken line segment, a second arc segment, and a third broken line segment connected in turn. One end of the first broken line segment is connected to the third edge 12*c*, and the other end of the first broken line segment is connected to the first arc segment. One end of the third broken line segment is connected to the second arc segment, and the other end of the third broken line segment is connected to the fourth edge 12*d*. The first arc segment is connected between the first broken line segment and the second broken line segment, and the second arc segment is connected between the second broken line segment and the third broken line segment. The first broken line segment includes a first line segment and a second line segment which are sequentially connected. The first line segment is connected to the third edge 12*c*, and the second line segment is connected to the first arc segment. The second line segment is parallel to the second direction D2, and an extension direction of the first line segment intersects with the first direction D1 and the second direction D2. The second broken line segment includes: a third line segment, a fourth line segment, and a fifth line segment which are sequentially connected. The third line segment is connected to the first arc segment, the fourth line segment is connected between the third line segment and the fifth line segment, and the fifth line segment is connected to the second arc segment. Extension directions of the third line segment and the fifth line segment are parallel to the first direction D1, and an extension direction of the fourth line segment is parallel to the second direction D2. The third broken line segment includes: a sixth line segment and a seventh line segment which are sequentially connected. The sixth line segment is connected to the second arc segment, and the seventh line segment is connected to the fourth edge 12*d*. An extension direction of the sixth line segment is parallel to the second direction D2, and an extension direction of the seventh line segment intersects with the first direction D1 and the second direction D2. However, this embodiment is not limited thereto. For example, the second edge may not include the first arc segment and the second arc segment, and may be formed by connecting the first broken line segment, the second broken line segment, and the third broken line segment.

In some exemplary implementation modes, as shown in FIG. 1A, the radiation patch 12 is symmetrical with respect to the axis OO'. The third edge 12*c* and the fourth edge 12*d* have a same length. The first line segment of the first broken line segment and the seventh line segment of the third broken line segment have a same length. The second line segment of the first broken line segment and the sixth line segment of the third broken line segment have a same length. The third line segment and the fifth line segment of the second broken line segment have a same length. The first arc segment and the second arc segment have a same radian. However, this embodiment is not limited thereto.

In some exemplary implementation modes, as shown in FIG. 1A, in a plane parallel to the first substrate, the radiation patch 12 has a notch 120. The notch 120 is at a second edge 12*b* of the radiation patch 12 and is surrounded by the first arc segment, the second broken line segment, and the second arc segment of the second edge 12*b*. In this example, the notch 120 is formed by depressing the second edge 12*b* to one side close to the first slot 121. At least part of the micro-strip 11 is in the notch 120 of the radiation patch 12, and has a certain distance from the second edge 12*b* of the radiation patch 12. The micro-strip 11 is on the central axis OO' of the antenna structure. In this example, the micro-strip 11 is entirely located in the notch 120 of the radiation patch 12, so as to achieve compact arrangement. In some examples, an edge of the micro-strip 11 away from one side of the first slot 121 may be flush with the second line segment of the first broken line segment of the second edge 12*b* of the radiation patch 12. Or, in the first direction D1, the edge of the micro-strip 11 away from one side of the first slot 121 may be on one side, close to the first slot 121, of the first broken line segment of the second edge 12*b* of the radiation patch 12. However, this embodiment is not limited thereto. In some examples, one end of the micro-strip 11 may extend into the notch 120 of the radiation patch 12, and the other end of the micro-strip 11 may be located outside the notch 120 of the radiation patch 12.

In some examples, an orthographic projection of the micro-strip 11 on the first dielectric substrate 10 may be a rectangle. However, this embodiment is not limited thereto.

In some exemplary implementation modes, as shown in FIG. 1A, the first slot 121 of the radiation patch 12 is close to the first edge 12*a* and is away from the second edge 12*b*. In the first direction D1, a distance from the first slot 121 to the first edge 12*a* is less than that from the first slot 121 to the second edge 12*b*. In the first direction D1, a perpendicular distance from a center line of the first slot 121 to the fourth line segment of the second broken line segment of the second edge 12*b* is greater than that from the center line of the first slot 121 to the first edge 12*a*. The first slot 121 may extend in the second direction D2. For example, an orthographic projection of the first slot 121 on the first dielectric substrate 10 may be a rectangle. However, this embodiment is not limited thereto. In this implementation mode, a feed point is formed by the micro-strip 11, and the first slot is formed at a position away from the feed point, so that the antenna structure is changed from single frequency point resonance to dual frequency resonance.

In some exemplary implementation modes, as shown in FIG. 1A and FIG. 1B, an orthogonal projection of the radiation patch 12 on the second dielectric substrate 20 does not overlap with an orthogonal projection of the feed structure 22 on the second dielectric substrate 20. An orthogonal projection of the micro-strip 11 on the second dielectric substrate 20 overlaps with an orthogonal projection of the feed structure 22 on the second dielectric substrate 20. The ground layer 21 may cover a surface of the second dielectric substrate 20 away from the first substrate 1. The orthogonal projections of the radiation patch 12, the micro-strip 11, and the feed structure 22 on the second dielectric substrate 20 are all within an orthogonal projection of the ground layer 21 on the second dielectric substrate 20.

In some exemplary implementation modes, as shown in FIG. 1A and FIG. 1B, the feed structure 22 is electrically connected to the micro-strip 11 through a conductive post 220. For example, one end of the conductive post 220 may penetrate through the first dielectric substrate 10 to be in direct contact with a surface of the micro-strip 11 close to the first dielectric substrate 11, and the other end of the conductive post 220 is in direct contact with a surface of the feed structure 22 away from the second dielectric substrate 20. However, this embodiment is not limited thereto. For example, a metal via may be formed in the feed structure 22. One end of the conductive post 220 may extend into the metal via of the feed structure 22, so as to achieve electrical connection with the feed structure 22.

In some exemplary implementation modes, as shown in FIG. 1A, an orthographic projection of the conductive post 220 on the first dielectric substrate 10 is within an orthographic projection of the notch 120 of the radiation patch 12 on the first dielectric substrate 10. The conductive post 220 is on the central axis OO'. A connection position of the conductive post 220 with the micro-strip 11 is the feed point of the radiation patch 12. In some examples, an orthographic projection of the conductive post 220 on the second dielectric substrate 20 may be circular. However, this embodiment is not limited thereto.

In some exemplary implementation modes, as shown in FIG. 1A, the feed structure 22 includes: a feed main body 221, a first branch, and a second branch. The first branch includes a first feed branch 222*a* and a first open-circuit branch 223*a* which are sequentially connected. The second branch includes a second feed branch 222*b* and a second open-circuit branch 223*b* which are sequentially connected. The feed structure 22 is symmetrical with respect to the central axis OO'. The feed main body 221 is on the central axis OO'. The first branch and the second branch are symmetrically connected to two sides of the feed main body 221 with respect to the central axis OO'. The first feed branch 222*a* and the second feed branch 222*b* are symmetrical with each other with respect to the central axis OO'. The first open-circuit branch 223*a* and the second open-circuit branch 223*b* are symmetrical with each other with respect to the central axis OO'. The first feed branch 222*a* and the second feed branch 222*b* respectively extend in a direction away from the feed main body 221, in the second direction D2. The first open-circuit branch 223*a* is connected to the first feed branch 222*a*. The second open-circuit branch 223*b* is connected to the second feed branch 222*b*. Each of the first open-circuit branch 223*a* and the second open-circuit branch 223*b* includes a first extension part and a second extension part which are sequentially connected. The first extension part extends in a direction away from the first feed branch 222*a*, in the first direction D1. The second extension part extends towards the feed main body 221 in the second direction D2. As shown in FIG. 1A, the first open-circuit branch 223*a* may be in a shape of an L after being rotated 270° clockwise, and the second open-circuit branch 223*b* may be in a shape of an L after being rotated by 90° counterclockwise. The first feed branch 222*a* and the second feed branch 222*b* are coupled with the second edge 12*b* of the radiation patch 12. The first open-circuit branch 223*a* is coupled with the third edge 12*c* of the radiation patch 12. The second open-circuit branch 223*b* is coupled with the fourth edge 12*d* of the radiation patch 12. The feed structure 22 of this implementation mode may introduce a high-frequency zero radiation point and a low-frequency zero radiation point.

In some exemplary implementation modes, as shown in FIG. 1A, an orthographic projection of a first end of the feed main body 221 on the second dielectric substrate 20 is inserted into an orthographic projection of the notch 120 of the radiation patch 12 on the second dielectric substrate 20. The first end of the feed main body 221 is in an arc shape. In some examples, a circle center corresponding to the arc shape of the first end of the feed main body 221 coincides with a circle center of the conductive post 220. However, this embodiment is not limited thereto.

In the present disclosure, a first length represents a length in the first direction D1, and a second length represents a length in the second direction D2. A width represents a width in a direction perpendicular to a wiring extension direction of.

In some exemplary implementation modes, as shown in FIG. 1A, each of the width of the first feed branch 222*a* and the width of the second feed branch 222*b* (i.e., the first length) is less than a width of the feed main body 221 (i.e., the second length). A width of the first open-circuit branch 223*a* is less than that of the first feed branch 222*a*. A width of the second open-circuit branch 223*b* is less than that of the second feed branch 222*b*. There is impedance transformation from the feed main body 221 to the two feed branches to realize a step impedance transformation structure. In this implementation mode, out-of-band rejection characteristics and a selectivity of the antenna structure are adjusted through the step impedance transformation structure and the open-circuit branches.

In some exemplary implementation modes, the first substrate 1 and the second substrate 2 may be Printed Circuit Boards (PCBs). The first substrate 1 and the second substrate 2 may be obtained by a circuit board preparation process. However, this embodiment is not limited thereto.

Figure 1C:
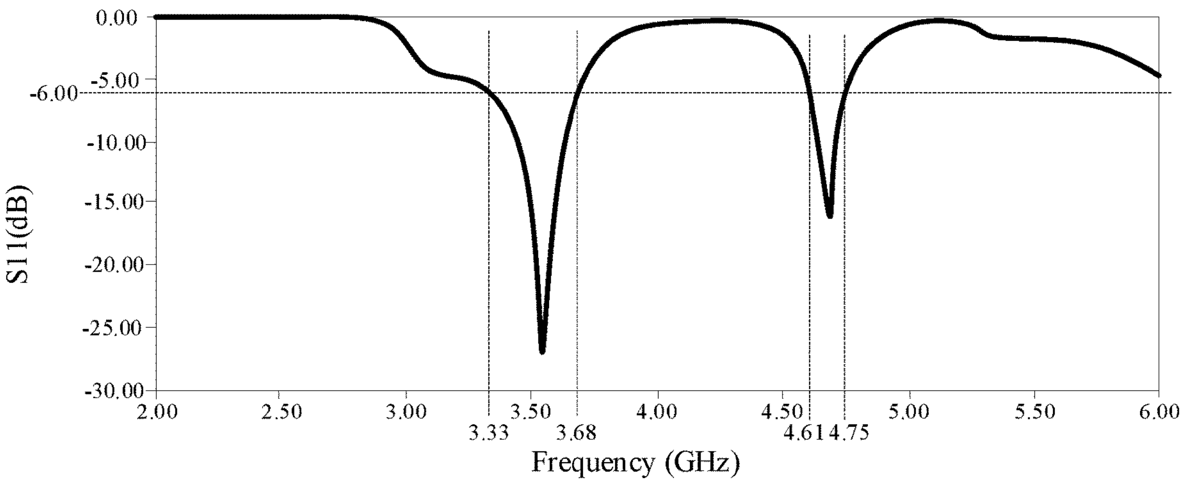
FIG. 1C illustrates a simulation result diagram of a curve S11 of the antenna structure as shown in FIG. 1A.
Figure 1D:
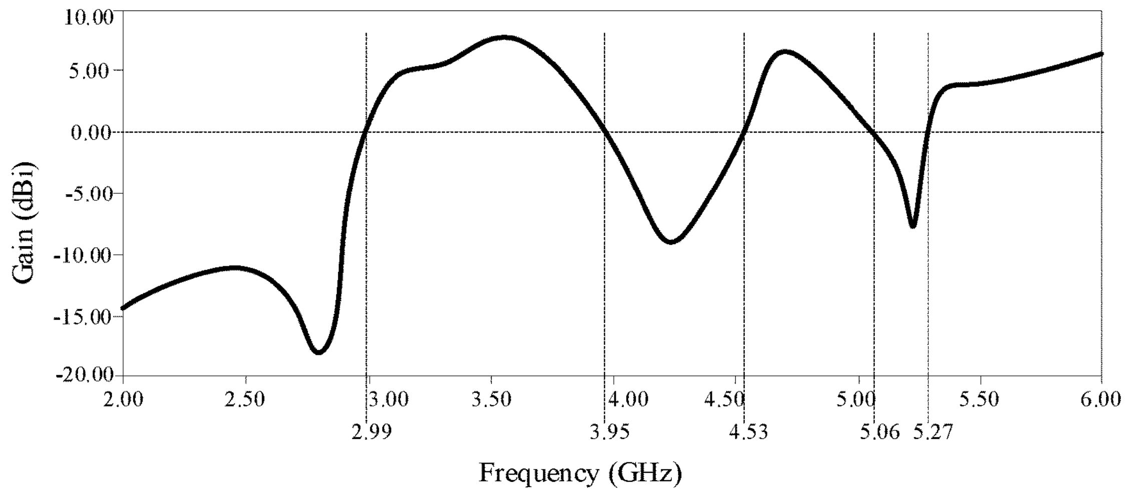
FIG. 1D illustrates a simulation result diagram of a gain curve of the antenna structure as shown in FIG. 1A.

FIG. 1C illustrates a simulation result diagram of a curve S11 of the antenna structure as shown in FIG. 1A. FIG. 1D illustrates a simulation result diagram of a gain curve of the antenna structure as shown in FIG. 1A. In the present disclosure, a plane dimension is represented as the first length*the second length, wherein the first length is a length in the first direction D1, and the second length is a length in the second direction D2. A thickness is a length in a direction perpendicular to a plane where the first direction D1 and the second direction D2 are located.

In some exemplary implementation modes, a dielectric constant dk/a dielectric loss df of the first dielectric substrate 10 and the second dielectric substrate 20 is about 2.65/0.002. A thickness of the first dielectric substrate 10 is about 1.44 mm to 1.76 mm, for example, about 1.6 mm. A thickness of the second dielectric substrate 20 is about 0.45 mm to 0.55 mm, for example, about 0.5 mm. A thickness of the dielectric layer 30 between the first dielectric substrate 10 and the second dielectric substrate 20 is about 2.7 mm to 3.3 mm, for example, about 3.0 mm. Thicknesses of the micro-strip 11, the radiation patch 12, the ground layer 21, and the feed structure 22 may be about 16.2 microns to 19.8 microns, for example, about 18 microns. The micro-strip 11, the radiation patch 12, the ground layer 21, and the feed structure 22 may be made of metal materials with good electrical conductivity, for example, any one or more of gold (Au), silver (Ag), copper (Cu) and aluminum (Al), or an alloy made of any one or more of the abovementioned metals. In some examples, the micro-strip 11, the radiation patch 12, the ground layer 21, and the feed structure 22 may be made of copper (Cu). A center frequency point $f_0$ of antenna simulation is 4 GHz, and a corresponding vacuum wavelength is $\lambda_0$.

In some exemplary implementation modes, as shown in FIG. 1A, the plane dimension of the first dielectric substrate 10 and the second dielectric substrate 20 is about 45.0 mm*50.0 mm. A length a1 of the first edge 12*a* of the radiation patch 12 is about 28.0 mm. A length a2 of each of the third edge 12*c* and the fourth edge 12*d* of the radiation patch 12 is about 23.4 mm. Lengths a3 of the first line segment of the first broken line segment and the seventh line segment of the third broken line segment of the second edge 12*b* of the radiation patch 12 are both about 3.7 mm. Lengths a4 of the second line segment of the first broken line segment and the sixth line segment of the third broken line segment of the second edge 12*b* are both about 6.5 mm. Lengths a5 of the third line segment and the fifth line segment of the second broken line segment of the second edge 12*b* are both about 5.4 mm. A length a6 of the fourth line segment of the second broken line segment of the second edge 12*b* is about 4.6 mm. A radius of the first arc segment and the second arc segment of the second edge 12*b* is about 2.6 mm. A plane dimension of the first slot 121 of the radiation patch 12 is about 1.0 mm*25.5 mm. A distance a7 from the first slot 121 to the first edge 12*a* is about 1.5 mm. A plane dimension of the micro-strip 11 is about 7.0 mm*2.6 mm, and a distance between the micro-strip 11 and the radiation patch 12 is about 1.0 mm. A radius of the conductive post 220 is about 0.8 mm, and a distance from the center of the conductive post 220 to the fourth line segment of the second broken line segment of the second edge 12*b* of the radiation patch 12 is about 5.4 mm. A second length b1 of the feed main body 221 of the feed structure 12 is about 4.2 mm. A distance b2 from a second end of the feed main body 221 to the first feed branch 222*a* is about 9.0 mm. A distance b3 from a circle center of the arc of the first end of the feed main body 221 to the first feed branch 222*a* is about 5.0 mm. A radius of the arc of the first end of the feed main body 221 is about 2.1 mm. A second length b4 of each of the first feed branch 222*a* and the second feed branch 222*b* is about 16.0 mm, and a first length b5 is about 2.4 mm. A first length b6 of the first extension part of each of the first open-circuit branch 223*a* and the second open-circuit branch 223*b* is about 9.8 mm, with a second length being about 0.3 mm. A second length b7 of the second extension part is about 3.0 mm, with a first length being about 0.3 mm. That is to say, a width of each of the first open-circuit branch 223*a* and the second open-circuit branch 223*b* is about 0.3 mm.

In some exemplary implementation modes, as shown in FIG. 1C, an impedance bandwidth of the antenna structure at −6 dB is about 3.33 GHz to 3.68 GHz, and 4.61 GHz to 4.75 GHz. As shown in FIG. 1D, a gain bandwidth of the antenna structure at 0 dBi is about 2.99 GHz to 3.95 GHz, and 4.53 GHz to 5.06 GHz. The out-of-band rejection at a high frequency and the out-of-band rejection at a low frequency are respectively −18 dBi and −8.1 dBi, and selectivity of pass bands at the high frequency and the selectivity of a pass band at the low frequency are respectively −16 dBi and −15 dBi. The gain bandwidth of the antenna structure of this exemplary embodiment may cover the frequency bands of n77 and n79, the out-of-band rejection characteristic is good, and the pass band selectivity is high.

Figure 2A:
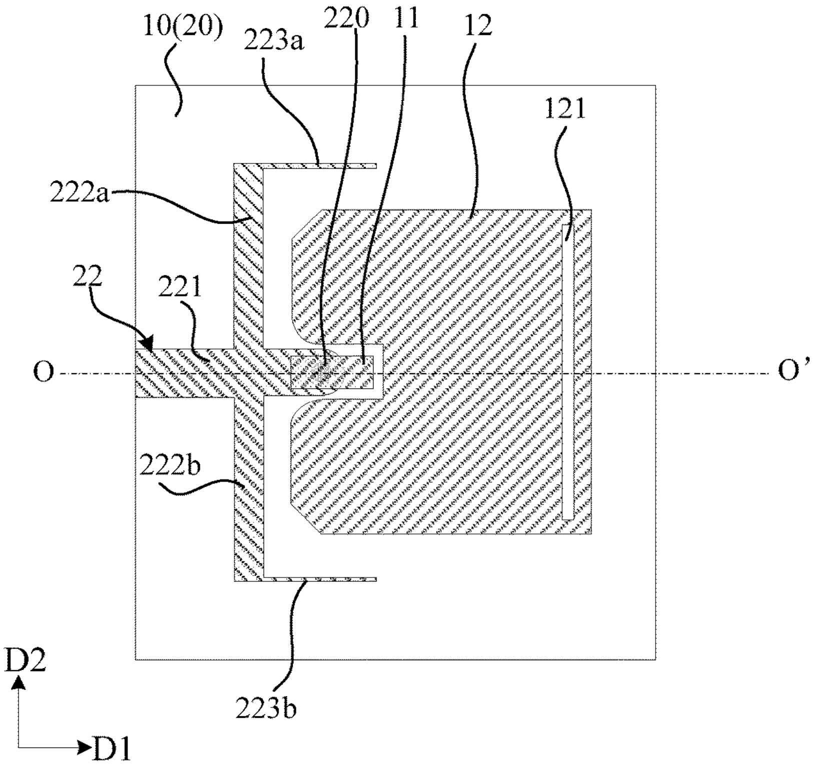
FIG. 2A illustrates another plane schematic diagram of the antenna structure of at least one embodiment of the present disclosure.
Figure 2B:
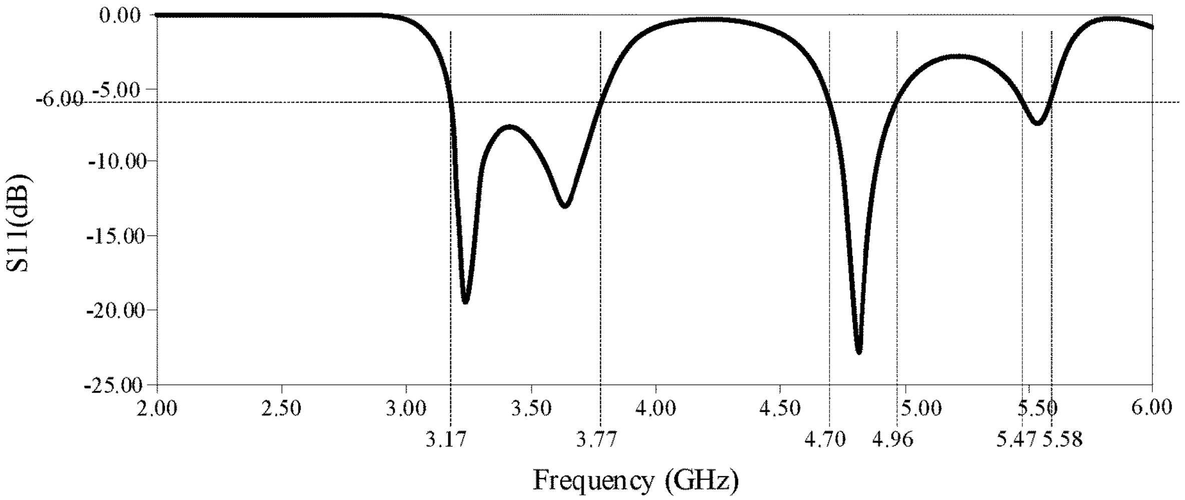
FIG. 2B illustrates a simulation result diagram of the curve S11 of the antenna structure as shown in FIG. 2A.
Figure 2C:
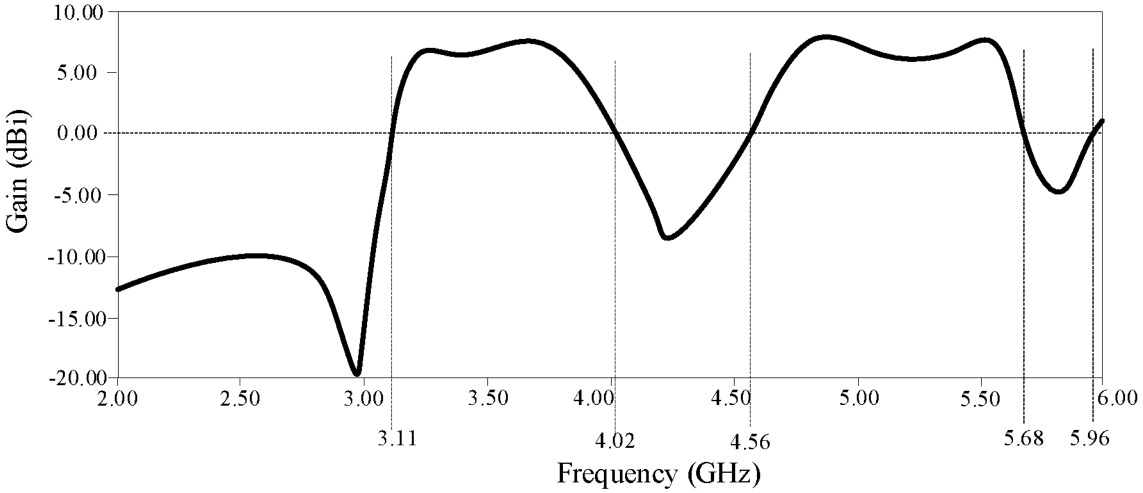
FIG. 2C illustrates a simulation result diagram of a gain curve of the antenna structure as shown in FIG. 2A.

FIG. 2A illustrates another plane schematic diagram of an antenna structure of at least one embodiment of the present disclosure. FIG. 2B illustrates a simulation result diagram of a curve Si 1 of the antenna structure as shown in FIG. 2A. FIG. 2C illustrates a simulation result diagram of a gain curve of the antenna structure as shown in FIG. 2A. In some exemplary implementation modes, as shown in FIG. 2A, each of the first open-circuit branch 223*a* and the second open-circuit branch 223*b* of the feed structure 22 only has a first extension part extending in the first direction D1. In this example, the first open-circuit branch 223*a* and the second open-circuit branch 223*b* are straight line segments parallel to the central axis OO'. The rest of structures of the antenna structure of this exemplary embodiment may refer to the description of the foregoing embodiments, which will not be repeated herein.

In some examples, a first length of the first extension part of each of the first open-circuit branch 223*a* and the second open-circuit branch 223*b* is about 9.8 mm, and the second length is about 0.3 mm. The rest of parameters relating to the antenna structure of this embodiment may refer to the description of the embodiment as shown in FIG. 1A, which will not be repeated herein.

In some exemplary implementation modes, as shown in FIG. 2B, an impedance bandwidth of the antenna structure at −6 dB is about 3.17 GHz to 3.77 GHz, and 4.70 GHz to 4.96 GHz. As shown in FIG. 2C, the gain bandwidth of the antenna structure at 0 dBi is about 3.11 GHz to 4.02 GHz, and 4.56 GHz to 5.68 GHz. The out-of-band rejection at a high frequency and the out-of-band rejection at a low frequency are respectively −19.4 dBi and −4.8 dBi, and the pass band selectivity at a high frequency and the pass band selectivity at a lower frequency are respectively −16 dBi and −16 dBi. The gain bandwidth of the antenna structure of this exemplary embodiment may cover the frequency bands of n77 and n79, the out-of-band rejection characteristic is good, and the pass band selectivity is high. Compared with a simulation result of the antenna structure as shown in FIG. 1A, the high-frequency gain bandwidth of the antenna structure of this example is increased significantly, and the gain flatness within the pass bands is better, but the high-frequency out-of-band rejection deteriorates. In this example, the first open-circuit branch 223*a* is adjacently coupled with the third edge 12*c* of the radiation patch 12. The second open-circuit branch 223*b* is adjacently coupled with the fourth edge 12*d* of the radiation patch 12. Compared with the antenna structure as shown in FIG. 1A, in the antenna structure of this example, an end coupling area between the first open-circuit branch 223*a* and the third edge 12*c* is increased, and an end coupling area between the second open-circuit branch 223*b* and the fourth edge 12*d* is increased, so that the coupling is enhanced, and the gain bandwidth is increased, but the high-frequency out-of-band rejection is deteriorated.

Figure 3A:
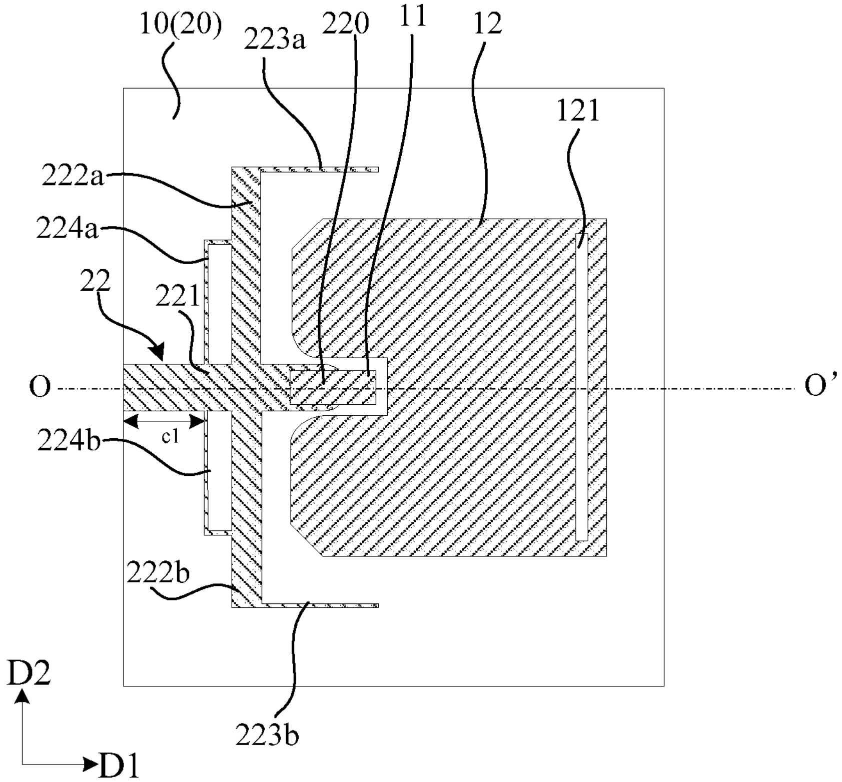
FIG. 3A illustrates another plane schematic diagram of the antenna structure of at least one embodiment of the present disclosure.
Figure 3B:
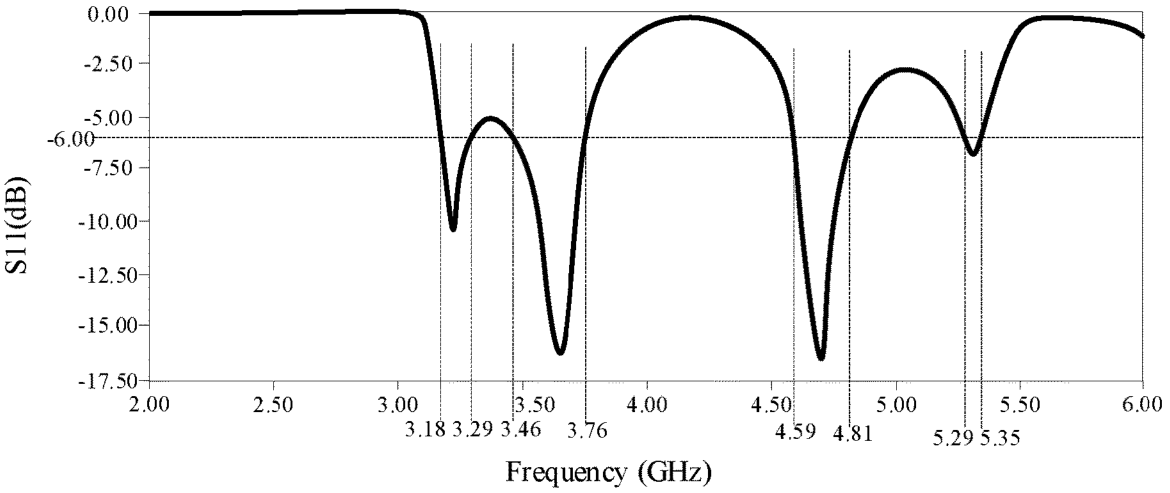
FIG. 3B illustrates a simulation result diagram of the curve S11 of the antenna structure as shown in FIG. 3A.
Figure 3C:
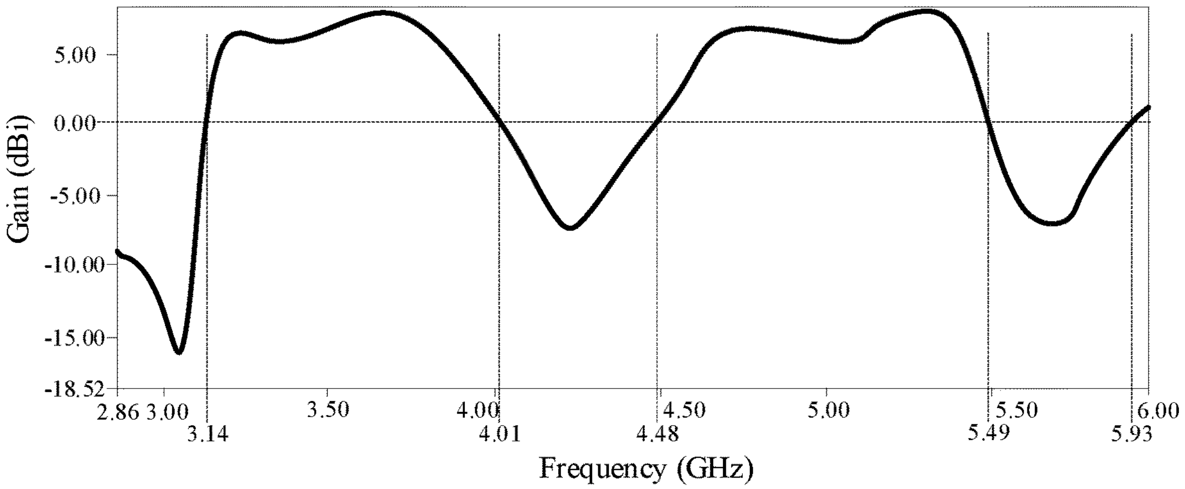
FIG. 3C illustrates a simulation result diagram of a gain curve of the antenna structure as shown in FIG. 3A.

FIG. 3A illustrates another plane schematic diagram of an antenna structure of at least one embodiment of the present disclosure. FIG. 3B illustrates a simulation result diagram of a curve S11 of the antenna structure as shown in FIG. 3A. FIG. 3C illustrates a simulation result diagram of a gain curve of the antenna structure as shown in FIG. 3A. In some exemplary implementation modes, as shown in FIG. 3A, the feed structure includes: a feed main body 221, a first branch, and a second branch. The feed main body 221 is on the central axis OO'. The first branch and the second branch are symmetrically connected to two ends of the feed main body 221 with respect to the central axis OO'. The first branch includes: a first feed branch 222*a*, a first open-circuit branch 223*a*, and a first short-circuit branch 224*a*. The second branch includes: a second feed branch 222*b*, a second open-circuit branch 223*b*, and a second short-circuit branch 224*b*. The first feed branch 222*a* and the second feed branch 222*b* are symmetrical with each other with respect to the central axis OO'. The first open-circuit branch 223*a* and the second open-circuit branch 223*b* are symmetrical with each other with respect to the central axis OO'. The first short-circuit branch 224*a* and the second short-circuit branch 224*b* are with each other with respect to the central axis OO'. The first short-circuit branch 224*a* is connected to the feed main body 221 and the first feed branch 222*a* respectively. The second short-circuit branch 223*b* is connected to the feed main body 221 and the second feed branch 222*b* respectively. The first short-circuit branch 224*a* and the second short-circuit branch 224*b* are on one side of the corresponding feed branches far away from the open-circuit branches. Each of the first short-circuit branch 224*a* and the second short-circuit branch 224*b* includes a third extension part and a fourth extension part which are sequentially connected. The third extension part is connected to the feed main body 221, and the fourth extension part is connected to a corresponding feed branch. The third extension part extends towards in a direction away from the feed main body 221 in the second direction D2. The fourth extension part extends towards the feed branch in the first direction D1. The first short-circuit branch 224*a* may be in shape of an inverted L, and the second short-circuit branch 224*b* may be in shape of an L.

In some exemplary implementation modes, as shown in FIG. 3A, a second length of a gap between the first short-circuit branch 224*a* and the first feed branch 222*a* is greater than a first length of the gap between the first short-circuit branch 224*a* and the first feed branch 222*a*, and a second length of a gap between the second short-circuit branch 224*b* and the second feed branch 222*b* is greater than a first length of the gap between the second short-circuit branch 224*b* and the second feed branch 222*b*. However, in this embodiment, variations of the shape of the gap between the first short-circuit branch 224*a* and the first feed branch 222*a* are not limited, as long as the extension length of the first short-circuit branch 224*a* (i.e., a sum of the second length of the third extension part and the first length of the fourth extension part) remains unchanged, and variations of the shape of the gap between the second short-circuit branch 224*b* and the second feed branch 222*b* are not limited, as long as the extension length of the second short-circuit branch 224*b* remains unchanged.

In this implementation mode, the out-of-band rejection characteristic and the selectivity of the antenna structure are adjusted through the step impedance transformation structure, the open-circuit branches, and the short-circuit branches. The rest of structures of the antenna structure of this exemplary embodiment may refer to the description of the embodiment as shown in FIG. 2A, which will not be repeated herein.

In some exemplary implementation modes, a second length of the third extension part of each of the first short-circuit branch 224*a* and the second short-circuit branch 224*b* is about 10.0 mm, with a first length being about 0.3 mm. A first length of the fourth extension part of each of the first short-circuit branch 224*a* and the second short-circuit branch 224*b* is about 2.3 mm, with a second length being about 0.3 mm. A distance cl between the second end of the feed main body 221 and the first short-circuit branch 224*a* is about 6.7 mm. Rest of parameters relating to the antenna structure of this embodiment may refer to the description of the embodiment as shown in FIG. 1A, which will not be repeated herein.

In some exemplary implementation modes, as shown in FIG. 3B, an impedance bandwidth of the antenna structure at −6 dB is about 3.18 GHz to 3.76 GHz, and 4.59 GHz to 4.81 GHz. As shown in FIG. 3C, a gain bandwidth of the antenna structure at 0 dBi is about 3.14 GHz to 4.01 GHz, and 4.48 GHz to 5.49 GHz. The out-of-band rejection at a high frequency and the out-of-band rejection at a low frequency are respectively −16.4 dBi and −7.2 dBi, and the selectivity of a pass band at the high frequency and the selectivity of a pass band at the low frequency are respectively −15 dBi and −15 dBi. The gain bandwidth of the antenna structure of this implementation mode may cover the frequency bands of n77 and n79, the out-of-band rejection characteristic is good, the pass band selectivity is high, and the gain flatness within the pass bands is good. Compared with a simulation result of the antenna structure as shown in FIG. 2A, the low-frequency out-of-band rejection of the antenna structure of this example is improved. In this example, the low-frequency out-of-band rejection characteristic may be significantly improved by introducing a pair of short-circuit branches in the feed structure. In the antenna structure as shown in FIG. 1A, the first feed branch 222*a* is adjacently coupled with the first broken line segment and the first arc segment of the second edge 12*b* of the radiation patch 12. The second feed branch 222*b* is adjacently coupled with the second arc segment and the third broken line segment of the second edge 12*b* of the radiation patch 12. As shown in FIG. 1C, there is an unobvious resonance peak between 3.0 GHz and 3.33 GHz. In the antenna structure of this example, distribution of current on the first feed branch 222*a* and the second feed branch 222*b* is changed by introducing the first short-circuit branch 224*a* and the second short-circuit branch 224*b*, so that an obvious resonance peak appears between 3.18 GHz and 3.29 GHz as shown in FIG. 3B, thereby enhancing the low-frequency out-of-band rejection characteristic of the antenna structure.

Figure 4A:
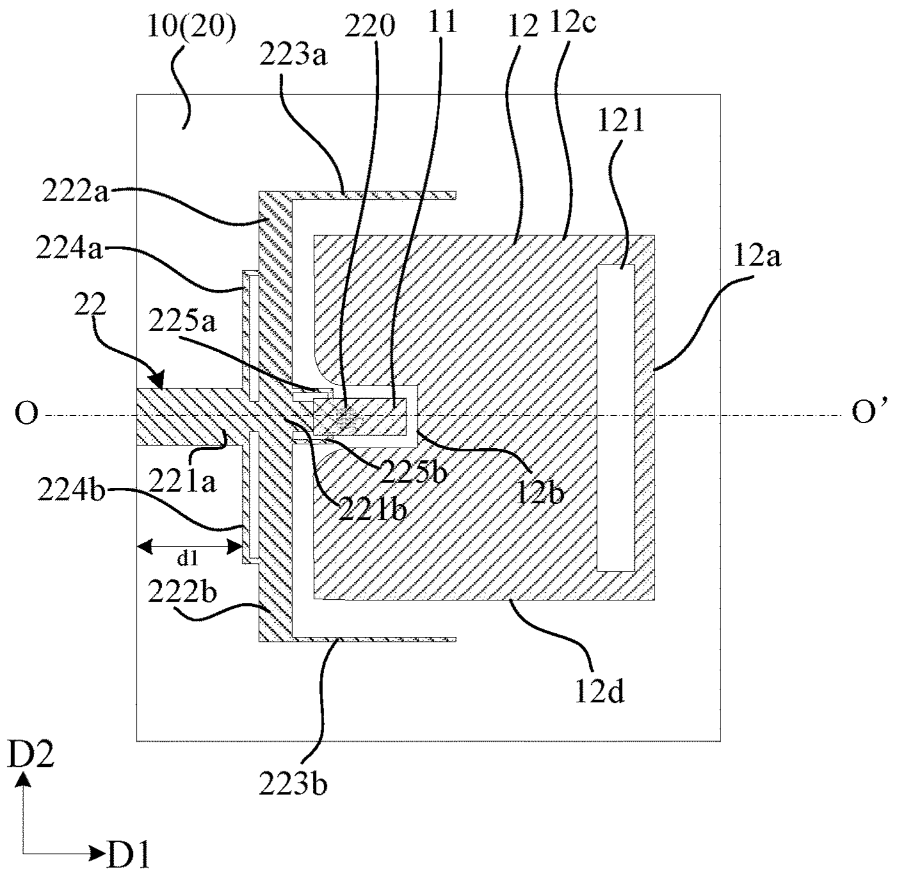
FIG. 4A illustrates another plane schematic diagram of the antenna structure of at least one embodiment of the present disclosure.
Figure 4B:
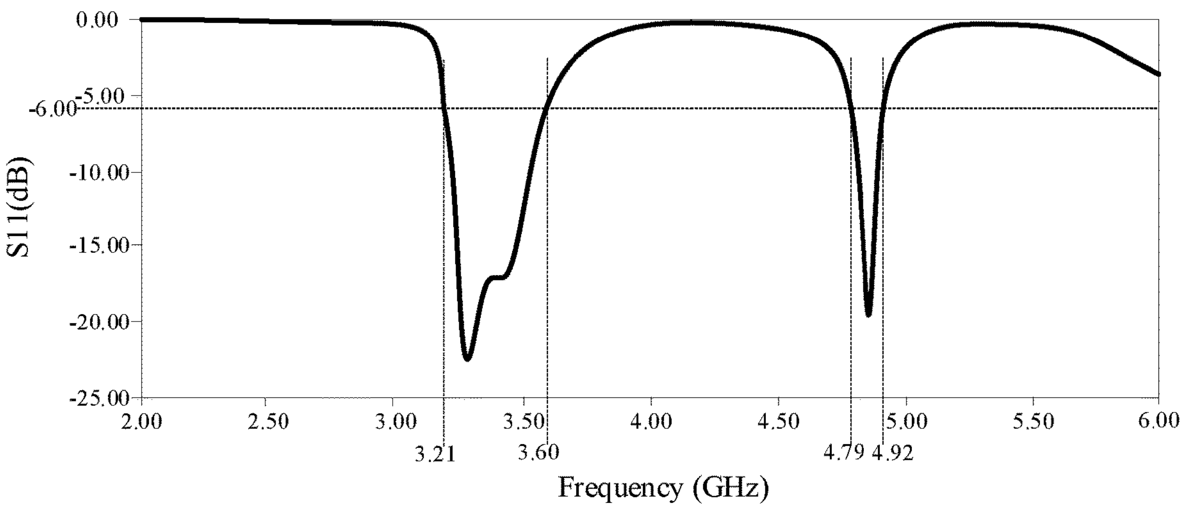
FIG. 4B illustrates a simulation result diagram of a curve S11 of the antenna structure as shown in FIG. 4A.
Figure 4C:
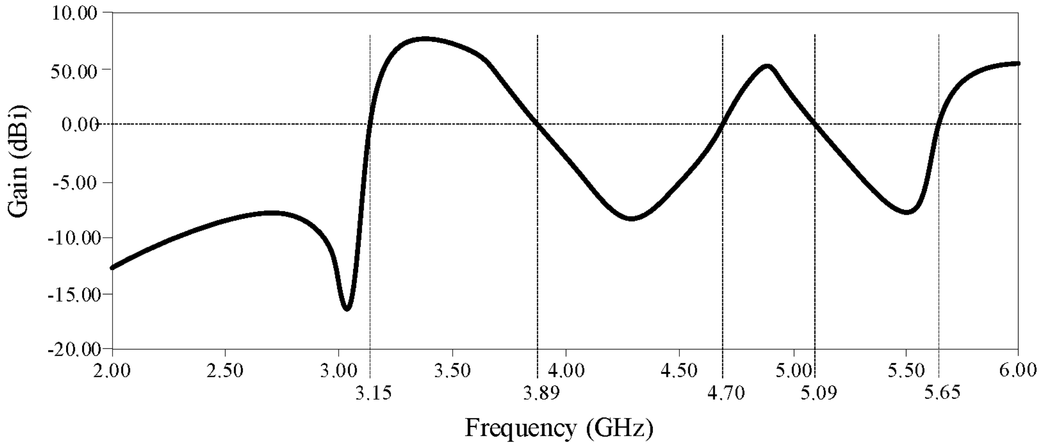
FIG. 4C illustrates a simulation result diagram of a gain curve of the antenna structure as shown in FIG. 4A.

FIG. 4A illustrates another plane schematic diagram of an antenna structure of at least one embodiment of the present disclosure. FIG. 4B illustrates a simulation schematic diagram of a curve S11 of the antenna structure as shown in FIG. 4A. FIG. 4C illustrates a simulation result diagram of a gain curve of the antenna structure as shown in FIG. 4A. In some exemplary implementation modes, as shown in FIG. 4A, the second edge 12*b* of the radiation patch 12 includes a first straight line segment, a first arc segment, a broken line segment, a second arc segment, and second straight line segment which are sequentially connected. The broken line segment includes a third line segment, a fourth line segment, and a fifth line segment which are sequentially connected.

In some exemplary implementation modes, as shown in FIG. 4A, the feed structure includes: a feed main body 221, a first branch, and a second branch. The feed main body 221 is on the central axis OO'. The feed main body 221 includes: a first feed main body 221*a* and a second feed main body 221*b* which are sequentially connected. A first end of the second feed main body 221*b* is connected to the first feed main body 221*a*. A second end of the second feed main body 221*b* is in an arc shape and is electrically connected to the micro-strip 11 through the conductive post 220. A circle center corresponding to the arc shape of the second end of the second feed main body 221*b* may coincide with the circle center of the conductive post 220. However, this embodiment is not limited thereto. In this example, a width (i.e., the second length) of the second feed main body 221*b* is less than a width (i.e., the second length) of the first feed main body 221*a*. The width from the first feed main body 221*a* to the second feed main body 221*b* becomes narrower, there is primary impedance transformation, and distribution of current here is discontinuous.

In some exemplary implementation modes, as shown in FIG. 4A, the first branch and the second branch are symmetrically connected to two ends of the feed main body 221 with respect to the central axis OO'. The first branch includes: a first feed branch 222*a*, a first open-circuit branch 223*a*, a first short-circuit branch 224*a*, and a third short-circuit branch 225*a*. The second branch includes: a second feed branch 222*b*, a second open-circuit branch 223*b*, a second short-circuit branch 224*b*, and a fourth short-circuit branch 225*b*. The first feed branch 222*a* and the second feed branch 222*b* are symmetrical with each other with respect to the central axis OO'. The first open-circuit branch 223*a* and the second open-circuit branch 223*b* are symmetrical with each other with respect to the central axis OO'. The first short-circuit branch 224*a* and the second short-circuit branch 224*b* are with each other with respect to the central axis OO'. The third short-circuit branch 225*a* and the fourth short-circuit branch 225*b* are with each other with respect to the central axis OO'. The first short-circuit branch 224*a* is connected to the first feed main body 221*a* and the first feed branch 222*a* respectively. The second short-circuit branch 224*b* is connected to the first feed main body 221*a* and the second feed branch 222*b* respectively. The third short-circuit branch 225*a* is connected to the first feed branch 222*a* and the second feed main body 221*b* respectively. The fourth short-circuit branch 225*b* is connected to the second feed branch 222*b* and the second feed main body 221*b* respectively.

In some exemplary implementation modes, as shown in FIG. 4A, the first short-circuit branch 224*a* and the second short-circuit branch 224*b* are on one side of the corresponding feed branches away from the open-circuit branches. The third short-circuit branch 225*a* and the fourth short-circuit branch 225*b* are on one side of the corresponding feed branches close to the open-circuit branches. Each of the third short-circuit branch 225*a* and the fourth short-circuit branch 225*b* includes a fifth extension part and a sixth extension part which are sequentially connected. The fifth extension part extends in a direction away from the corresponding feed branch in the first direction D1. The sixth extension part extends towards the second feed main body 221*b* in the second direction D2. The third short-circuit branch 225*a* may be in a shape of an L after being rotated by 270° clockwise, and the fourth short-circuit branch 225*b* may be in a shape of an L after being rotated by 90° counterclockwise.

An extension length of the first short-circuit branch 224*a* of the antenna structure as shown in FIG. 4A (i.e., a sum of the second length of the third extension part and the first length of the fourth extension part) may be approximately equal to an extension length of the first short-circuit branch 224*a* of the antenna structure as shown in FIG. 3A. Compared with the antenna structure of the embodiment as shown in FIG. 3A, as shown in FIG. 4A, a distance between the first short-circuit branch 224*a* and the first feed branch 222*a* of the antenna structure of this example is narrowed, and a distance between the second short-circuit branch 224*b* and the second feed branch 222*b* is narrowed.

In some exemplary implementation modes, as shown in FIG. 4A, a first length of a gap between the third short-circuit branch 225*a* and the first feed branch 222*a* is greater than a second length of the gap between the third short-circuit branch 225*a* and the first feed branch 222*a*. A first length of a gap between the fourth short-circuit branch 225*b* and the second feed branch 222*b* is greater than a second length of the gap between the fourth short-circuit branch 225*b* and the second feed branch 222*b*. However, in this embodiment, variations of the shape of the gap between the third short-circuit branch 225*a* and the first feed branch 222*a* are not limited, as long as an extension length of the third short-circuit branch 225*a* (i.e., a sum of the first length of the fifth extension part and the second length of the sixth extension part) remains unchanged, and variations of the shape of the gap between the fourth short-circuit branch 225*b* and the second feed branch 222*b* are not limited, as long as an extension length of the fourth short-circuit branch 225*b* remains unchanged.

In present exemplary implementation mode, an orthographic projection of the third short-circuit branch 225*a* and the fourth short-circuit branch 225*b* on the first dielectric substrate 10 does not overlap with an orthographic projection of the radiation patch 12 on the first dielectric substrate 10, which can avoid introducing a new resonant frequency point due to the overlapping of the two orthographic projections.

In some exemplary implementation modes, compared with the antenna structure as shown in FIG. 3A, the first length of the first slot 121 of the radiation patch 12 of the antenna structure as shown in FIG. 4A is increased, and the second length thereof is decreased.

In this implementation mode, distribution of the surface current of the feed structure is changed by the step impedance transformation structure, the open-circuit branches, and the short-circuit branches, so as to adjust the out-of-band rejection characteristic and the selectivity of the antenna structure.

The rest of structures of the antenna structure of this exemplary embodiment may refer to the description of the embodiment as shown in FIG. 3A, which will not be repeated herein.

In some exemplary implementation modes, as shown in FIG. 4A, a length of each of the first straight line segment and the second straight line segment of the second edge 12*b* of the radiation patch 12 is about 9.1 mm, and a length of each of the third edge 12*c* and the fourth edge 12*d* is about 26.0 mm. A plane dimension of the first slot 121 of the radiation patch 12 is about 3.0 mm*23.5 mm. A second length of the first feed main body 221*a* is about 4.2 mm, and a second length of the second feed main body 221*b* is about 2.4 mm. A distance from the center of the conductive post 220 to the fourth line segment of the broken line segment of the second edge 12*b* of the radiation patch 12 is about 5.4 mm. A distance d1 between a second end of the first feed main body 221*a* and the first short-circuit branch 224*a* is about 8.4 mm. A second length of the third extension parts of the first short-circuit branch 224*a* and the second short-circuit branch 224*b* is about 10.0 mm, with a first length being about 0.3 mm. A first length of the fourth extension part is about 0.9 mm, with a second length being about 0.3 mm. The rest of parameters relating to the antenna structure of this embodiment may refer to the description of the embodiment as shown in FIG. 3A, which will not be repeated herein.

In some exemplary implementation modes, as shown in FIG. 4B, an impedance bandwidth of the antenna structure at −6 dB is about 3.21 GHz to 3.60 GHz, and 4.79 GHz to 4.92 GHz. As shown in FIG. 4C, a gain bandwidth of the antenna structure at 0 dBi is about 3.15 GHz to 3.89 GHz, and 4.70 GHz to 5.09 GHz. The out-of-band rejection at a high frequency and the out-of-band rejection at a low frequency are respectively −16.5 dBi and −7.7 dBi, and the selectivity of a pass band at the high frequency and the selectivity of a pass band at the low frequency are respectively −16 dBi and −13 dBi. The gain bandwidth of the antenna structure of this implementation mode may only partially cover the frequency bands of n77 and n79, the out-of-band rejection characteristic is good, and the pass band selectivity is high. Compared with a simulation result of the antenna structure as shown in FIG. 3A, the gain bandwidth of the antenna structure of this example at 0 dBi is decreased, and the high-frequency gain bandwidth is significantly reduced. Compared with the antenna structure as shown in FIG. 3A, the antenna structure of this example will significantly change performance of an antenna in a high-frequency pass band by introducing another pair of short-circuit branches into the feed structure. In this example, the second feed main body 221*b* is adjacently coupled with the micro-strip 11. The distribution of current at the second feed main body 221*b* can be adjusted by introducing the third short-circuit branch 225*a* and the fourth short-circuit branch 225*b*, so as to change a coupling degree between the second feed main body 221*b* and the micro-strip 11, so as to change resonant characteristics of the antenna at a high frequency.

Figure 5A:
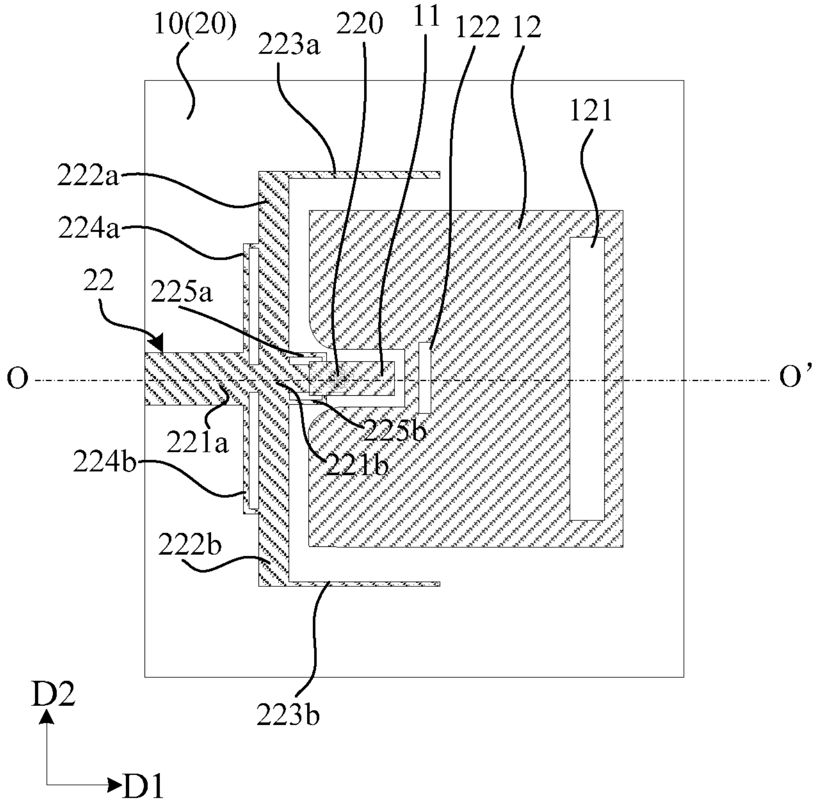
FIG. 5A illustrates another plane schematic diagram of an antenna structure of at least one embodiment of the present disclosure.
Figure 5B:
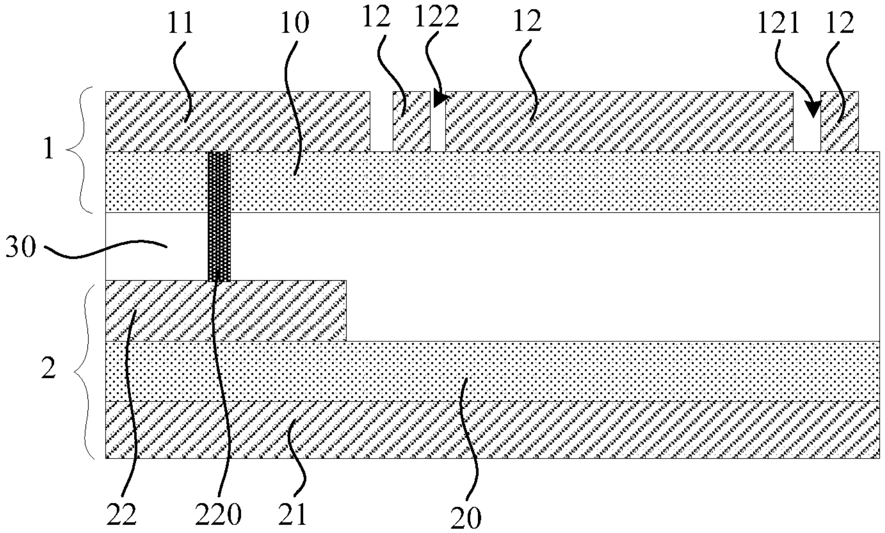
FIG. 5B illustrates a partial cross-sectional view of the antenna structure as shown in FIG. 5A along a central axis OO'.
Figure 5C:
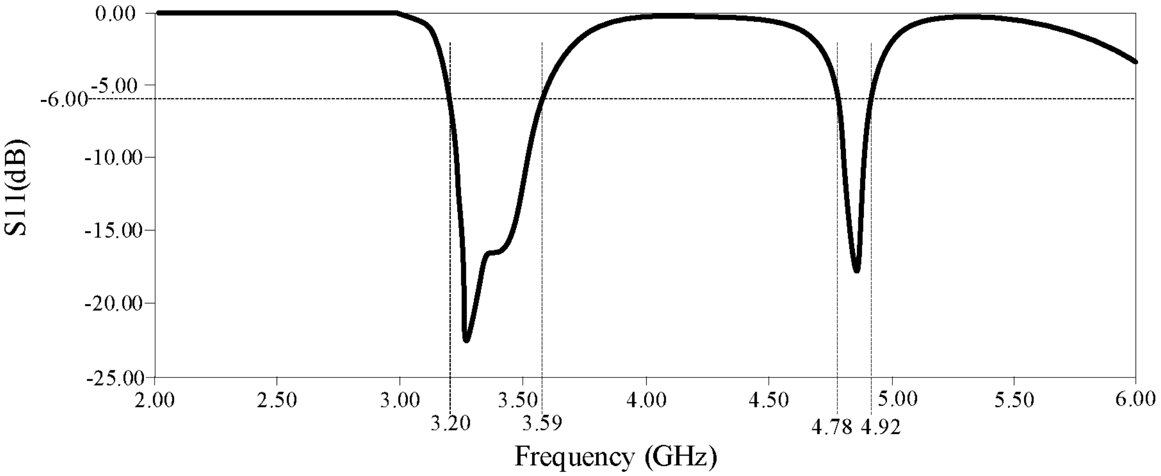
FIG. 5C illustrates a simulation result diagram of a curve S11 of the antenna structure as shown in FIG. 5A.
Figure 5D:
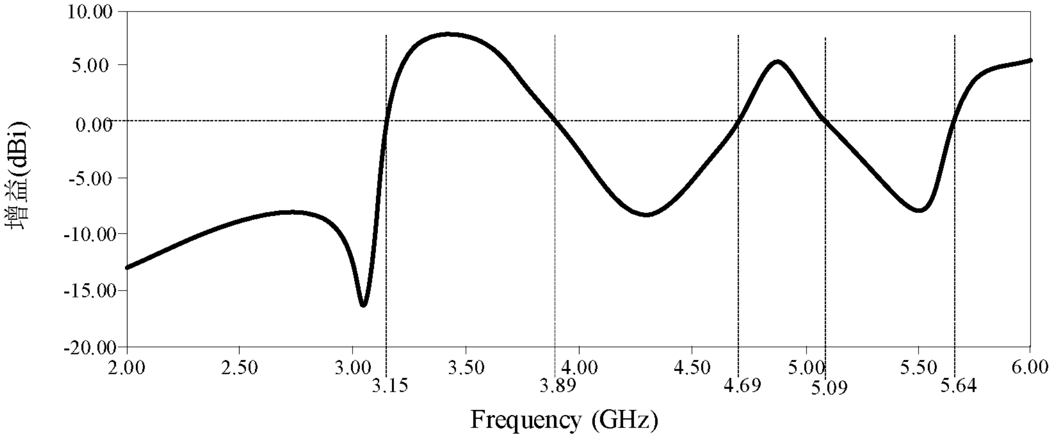
FIG. 5D illustrates a simulation result diagram of a gain curve of the antenna structure as shown in FIG. 5A.

FIG. 5A illustrates another plane schematic diagram of an antenna structure of at least one embodiment of the present disclosure. FIG. 5B illustrates a partial cross-sectional view of the antenna structure as shown in FIG. 5A along a central axis. FIG. 5C illustrates a simulation schematic diagram of a curve S11 of the antenna structure as shown in FIG. 5A. FIG. 5D illustrates a simulation result diagram of a gain curve of the antenna structure as shown in FIG. 5A. In some exemplary implementation modes, as shown in FIG. 5A and FIG. 5B, the radiation patch 12 has a first slot 121 and a second slot 122. The first slot 121 is on one side of the second slot 122 away from the micro-strip 11. The first slot 121 is away from the micro-strip 11, and the second slot 122 is close to the micro-strip 11. A length (i.e., the second length) of the first slot 121 in the second direction D2 is greater than a length of the second slot 122 in the second direction D2. The second slot 122 is symmetrical with respect to the central axis OO'. An orthographic projection of the second slot 122 on the first dielectric substrate 10 may be a rectangle. In some examples, a second length (i.e., a length of the fourth line segment of the second edge 12*b* of the radiation patch 12) of the second slot 122 is greater than a second length of the notch 120, and is greater than a width of the first feed main body 221*a*. However, this embodiment is not limited thereto. The rest of structures of the antenna structure of this exemplary embodiment may refer to the description of the embodiment as shown in FIG. 4A, which will not be repeated herein.

In some exemplary implementation modes, a plane dimension of the second slot 122 of the radiation patch 12 is about 1 mm*6 mm. A distance between the second slot 122 and the fourth line segment of the second edge 12*b* in the first direction D1 is about 1 mm, and a distance between the second slot 122 and the first slot 121 in the first direction D1 is about 11.5 mm. The rest of parameters relating to the antenna structure of this embodiment may refer to the description of the embodiment as shown in FIG. 4A, which will not be repeated herein.

In some exemplary implementation modes, as shown in FIG. 5C, an impedance bandwidth of the antenna structure at −6 dB is about 3.20 GHz to 3.59 GHz, and 4.78 GHz to 4.92 GHz. As shown in FIG. 5D, a gain bandwidth of the antenna structure at 0 dBi is about 3.15 GHz to 3.89 GHz, and 4.69 GHz to 5.09 GHz. The out-of-band rejection at a high frequency and the out-of-band rejection at a low frequency are respectively −16.5 dBi and −8 dBi, and the selectivity of a pass band at the high frequency and the selectivity of a pass band at the low frequency are respectively −16 dBi and −13.5 dBi. The gain bandwidth of the antenna structure of this exemplary embodiment may only partially cover the frequency bands of n77 n79, the out-of-band rejection characteristic is good, and the pass band selectivity is high. Compared with a simulation result of the antenna structure as shown in FIG. 4A, the gain bandwidth of the antenna structure of this example at 0 dBi and the impedance bandwidth at −6 dB are basically the same. Compared with the antenna structure as shown in FIG. 4A, in this example, performance of the antenna cannot be affected significantly by introducing the second slot in the radiation patch at one side close to the micro-strip.

Figure 6A:
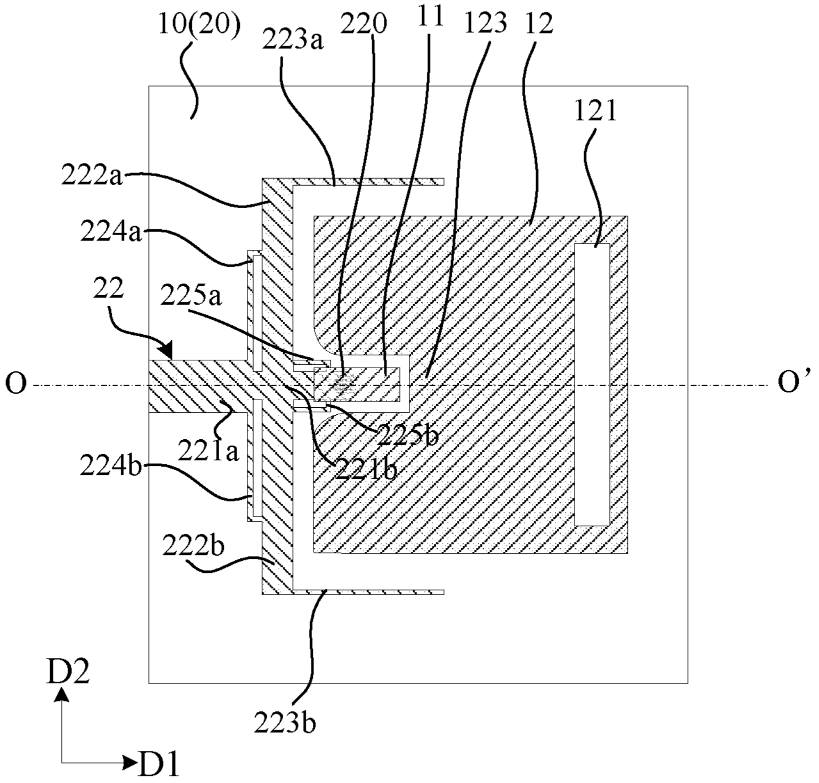
FIG. 6A illustrates another plane schematic diagram of an antenna structure of at least one embodiment of the present disclosure.
Figure 6B:
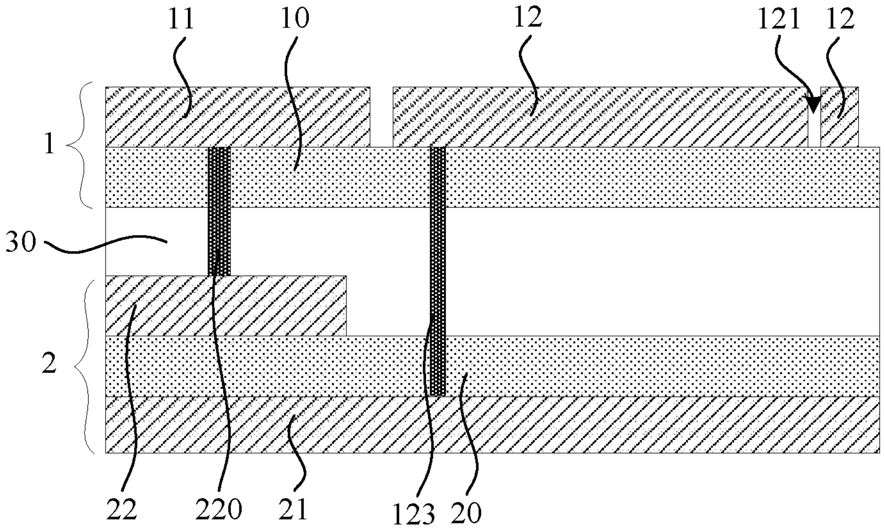
FIG. 6B illustrates a partial cross-sectional view of the antenna structure as shown in FIG. 6A along a central axis OO'.
Figure 6C:
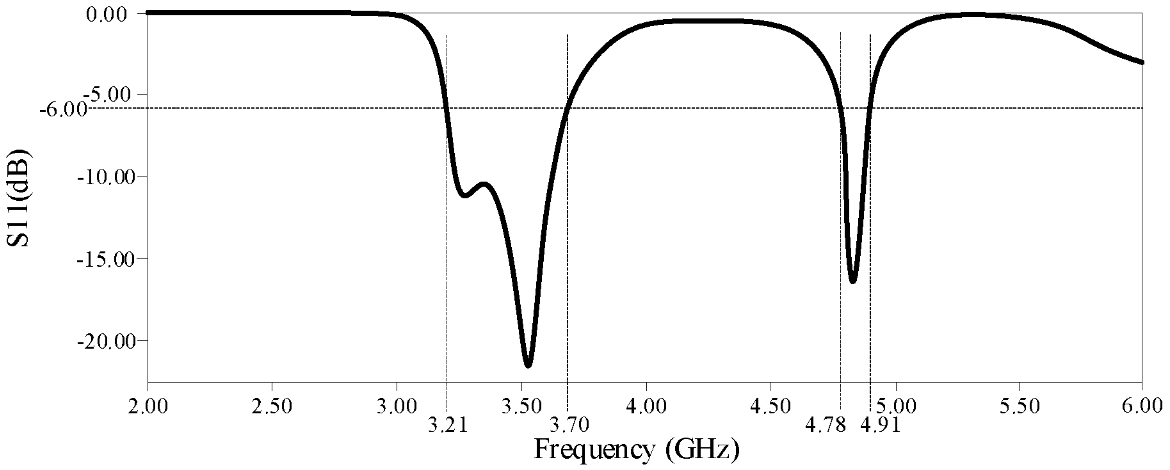
FIG. 6C illustrates a simulation result diagram of a curve S11 of the antenna structure as shown in FIG. 6A.
Figure 6D:
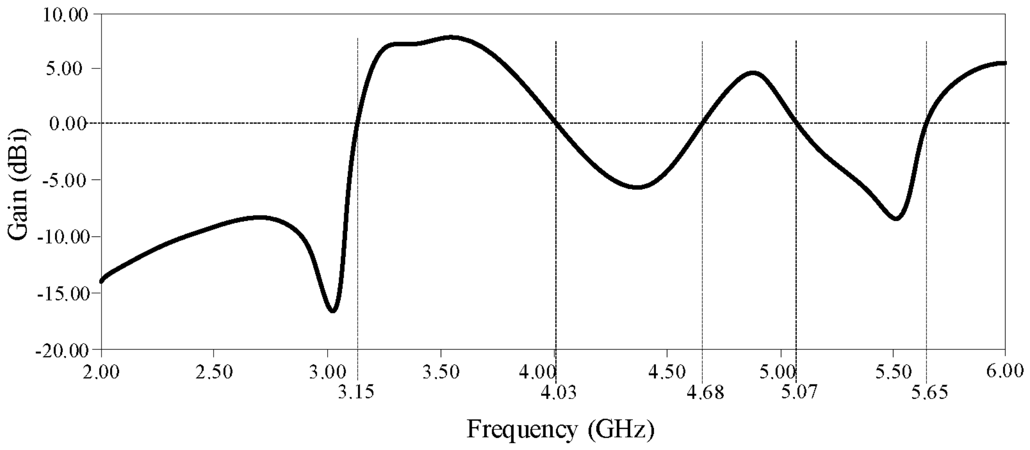
FIG. 6D illustrates a simulation result diagram of a gain curve of the antenna structure as shown in FIG. 6A.

FIG. 6A illustrates another schematic diagram of an antenna structure of at least one embodiment of the present disclosure. FIG. 6B illustrates a partial cross-sectional view of the antenna structure as shown in FIG. 6A along a central axis. FIG. 6C illustrates a simulation result diagram of a curve S11 of the antenna structure as shown in FIG. 6A. FIG. 6D illustrates a simulation result diagram of a gain curve of the antenna structure as shown in FIG. 6A. In some exemplary implementation modes, as shown in FIG. 6A and FIG. 6B, the radiation patch 12 is electrically connected to the ground layer 21 through a short-circuit pin 123. An orthogonal projection of the short-circuit pin 123 on the first dielectric substrate 10 is close to an orthogonal projection of the micro-strip 11 on the first dielectric substrate 10, and is away from an orthogonal projection of the first slot 121 on the first dielectric substrate 10. The short-circuit pin 123 is on the central axis OO'. The orthographic projection of the short-circuit pin 123 on the first dielectric substrate 10 may be circular. However, this embodiment is not limited thereto. The rest of structures of the antenna structure of this exemplary embodiment may refer to the description of the embodiment as shown in FIG. 4A, which will not repeated herein.

In some exemplary implementation modes, a radius of the short-circuit pin 123 may be about 0.2 mm. A distance between the short-circuit pin 123 and the second edge 12*b* may be about 1 mm. The rest of parameters relating to the antenna structure of this embodiment may refer to the description of the embodiment as shown in FIG. 4A, which will not be elaborated herein.

In some exemplary implementation modes, as shown in FIG. 6C, an impedance bandwidth of the antenna structure at −6 dB is about 3.21 GHz to 3.70 GHz, and 4.78 GHz to 4.91 GHz. As shown in FIG. 6D, a gain bandwidth of the antenna structure at 0 dBi is about 3.15 GHz to 4.03 GHz, and 4.68 GHz to 5.07 GHz. The out-of-band rejection at a high frequency and the out-of-band rejection at a low frequency are respectively −16.7 dBi and −8.7 dBi, and the selectivity of a pass band and the selectivity of a pass band are respectively −14 dBi and −11 dBi. The gain bandwidth of the antenna structure of this exemplary embodiment may only partially cover the frequency bands of n77 and n79. Compared with a simulation result of the antenna structure as shown in FIG. 4A, the gain bandwidth of the antenna structure of this example at 0 dBi and the impedance bandwidth at −6 dB are basically the same, but the band pass selectivity of the antenna is deteriorated. Compared with the antenna structure as shown in FIG. 4A, in this example, the performance of the antenna will be deteriorated by introducing the short-circuit pin between the radiation patch and the ground layer, and influence on the performance caused by a diameter of the short-circuit pin may be ignored.

According to the antenna structure provided by this exemplary embodiment, the first slot away from the micro-strip is formed in the radiation patch to introduce two resonant frequency points, one zero radiation point is generated between the two resonant frequency points, and one zero radiation point is introduced at each of the high frequency and the low frequency through the design of the feed structure, so that an antenna structure with dual-band pass filtering is implemented. According to this implementation mode, distribution of surface current of the radiation patch and the feed structure are changed through a plane structure design, so as to achieve a filtering function. The antenna structure provided by this embodiment may be applied to the frequency bands of n77 and n79 of 5G. The antenna structure of this embodiment can realize a high gain and a wide gain bandwidth in a first pass band, and can realize high pass band selectivity and good out-of-band rejection characteristic.

Figure 7:
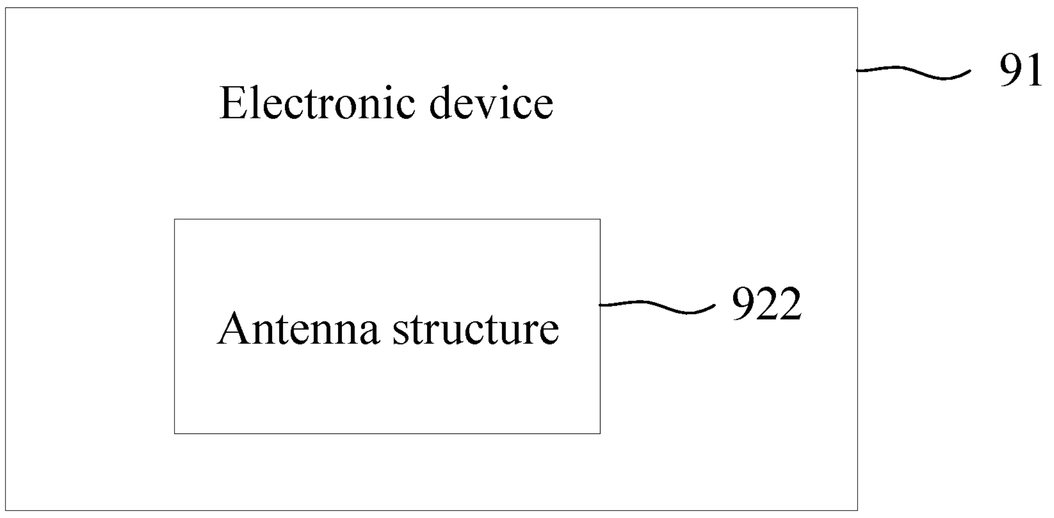
FIG. 7 illustrates a schematic diagram of an electronic device of at least one embodiment of the present disclosure.

FIG. 7 illustrates a schematic diagram of an electronic device of at least one embodiment of the present disclosure. As shown in FIG. 7, this embodiment provides an electronic device 91, including an antenna structure 922. The electronic device 91 may be: any product or component with a communication function, such as a mobile phone, a navigation apparatus, a game machine, a television (TV), a car audio system, a tablet computer, a Personal Media Player (PMP), and a Personal Digital Assistant (PDA). However, this embodiment is not limited thereto.

Figure 8:
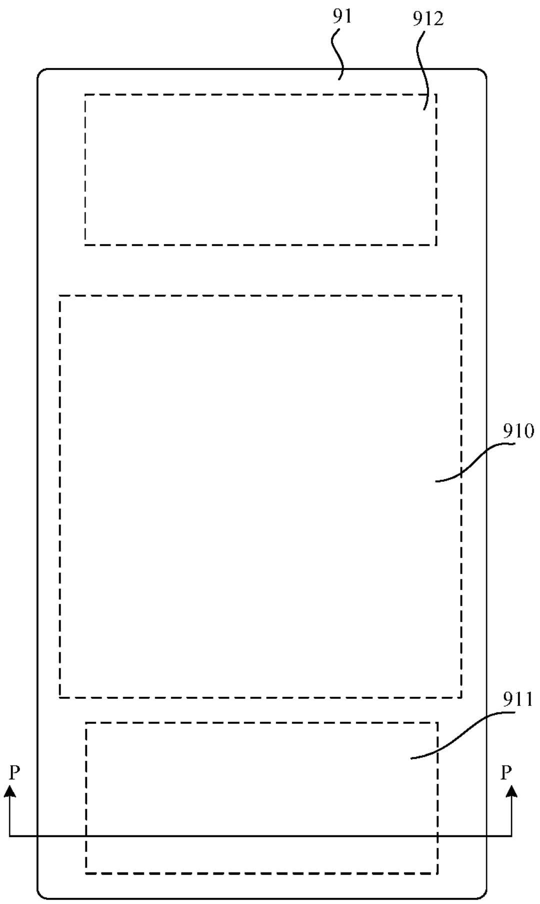
FIG. 8 illustrates a plane schematic diagram of the electronic device of at least one embodiment of the present disclosure.
Figure 9:
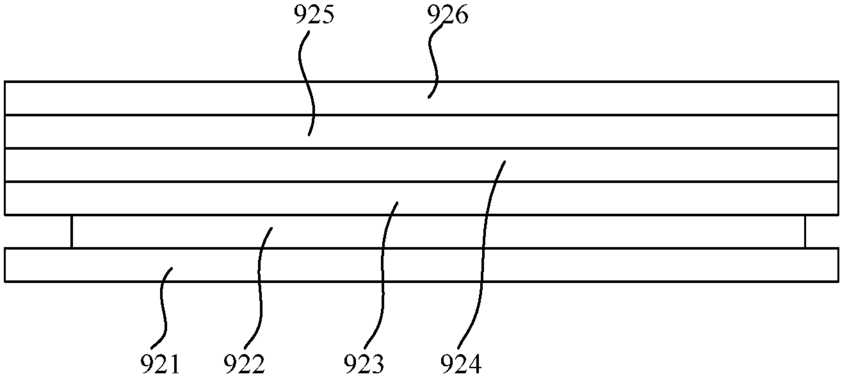
FIG. 9 illustrates a partial cross-sectional view along direction P-P in FIG. 8.

FIG. 8 illustrates a plane schematic diagram of an electronic device of at least one embodiment of the present disclosure. FIG. 9 illustrates a partial cross-sectional view in direction P-P in FIG. 8. In some exemplary implementation modes, the electronic device 91 being a display device is taken as an example. As shown in FIG. 8, in a plane parallel to the electronic device, the electronic device 91 includes: a battery area 910, and a first area 911 and a second area 912 located on two sides of the battery area 910. In some examples, a battery is arranged in the battery area 910. The antenna structure 922 may be arranged on at least one of the first area 911 and the second area 912. However, this embodiment is not limited thereto. In some examples, the antenna structure may be arranged in an area between the first area 911 and a frame of the electronic device 91, or arranged in an area between the second area 912 and the frame of the electronic device 91.

In some exemplary implementation modes, the antenna structure 922 being arranged in the first area 911 is taken as an example. As shown in FIG. 9, in a plane perpendicular to the electronic device, the electronic device 91 includes: a rear cover 921, an antenna structure 922, a housing 923, a printed circuit board 924, a display screen 925, and a glass cover plate 926. The glass cover plate 926 is in tight fit with the display screen 925, which can achieve a dust-proof effect on the display screen 925. The housing 923 mainly serves a function of supporting the whole device. The antenna structure 922 may be arranged on the rear cover 921, and is connected to the printed circuit board 924 through an opening in the housing 923. However, this embodiment is not limited thereto.

The accompanying drawings in the present disclosure only relate to structures related to the present disclosure, and other structures may refer to general designs. The embodiments of the present disclosure and features in the embodiments may be combined mutually to obtain new embodiments if there is no conflict.

Those of ordinary skills in the art should understand that modifications or equivalent substitutions may be made to the technical solutions of the present disclosure without departing from the spirit and scope of the technical solutions of the present disclosure, and should fall within the scope of the claims of the present disclosure.

The invention claimed is:

1. An antenna structure, comprising:

a first substrate and a second substrate, and a dielectric layer is provided between the first substrate and the second substrate;

wherein the first substrate comprises: a first dielectric substrate, and a radiation patch and a micro-strip which are arranged on the first dielectric substrate; the radiation patch and the micro-strip are on one side of the first dielectric substrate away from the second substrate;

orthographic projections of the micro-strip and the radiation patch on the first dielectric substrate do not overlap with each other, and the radiation patch has at least one first slot away from the micro-strip; and the second substrate comprises: a second dielectric substrate, a feed structure arranged on one side of the second dielectric substrate close to the first substrate, and a ground layer arranged on one side of the second dielectric substrate away from the first substrate; and the feed structure is electrically connected to the micro-strip.

2. The antenna structure according to claim 1, wherein the radiation patch is configured to introduce two resonant frequency points and one zero radiation point between the two resonant frequency points, and the feed structure is configured to introduce two zero radiation points.

3. The antenna structure according to claim 1, wherein the radiation patch has a first edge and a second edge in a first direction, the second edge is adjacent to the micro-strip, the first edge is away from the micro-strip, and a distance between the first slot and the first edge is less than a distance between the first slot and the second edge; and the first slot extends in a second direction, wherein the first direction intersects with the second direction.

4. The antenna structure according to claim 3, wherein in a plane parallel to the first substrate, the radiation patch has a notch at the second edge, and at least part of the micro-strip is located in the notch of the radiation patch.

5. The antenna structure according to claim 1, wherein the micro-strip is electrically connected to the feed structure through a conductive post.

6. The antenna structure according to claim 5, wherein the conductive post is in direct contact with the micro-strip and in direct contact with the feed structure.

7. The antenna structure according to claim 1, wherein the feed structure comprises: a feed main body, a first branch and a second branch; the antenna structure has a central axis in a first direction, the feed main body is on the central axis, and the first branch and the second branch are symmetrically connected to two sides of the feed main body with respect to the central axis.

8. The antenna structure according to claim 7, wherein the first branch comprises: a first feed branch and a first open-circuit branch, wherein the first open-circuit branch is electrically connected to the first feed branch, and the first open-circuit branch is on one side of the first feed branch away from the feed main body; and the second branch comprises: a second feed branch and a second open-circuit branch, the second open-circuit branch is electrically connected to the second feed branch, and the second open-circuit branch is on one side of the second feed branch away from the feed main body.

9. The antenna structure according to claim 8, wherein the first open-circuit branch and the second open-circuit branch are straight line segments parallel to the central axis; or the first open-circuit branch and the second open-circuit branch are L-shaped.

10. The antenna structure according to claim 8, wherein the first branch further comprises: a first short-circuit branch, and the first short-circuit branch is on one side of the first feed branch away from the first open-circuit branch;

the second branch further comprises: a second short-circuit branch, and the second short-circuit branch is on one side of the second feed branch away from the second open-circuit branch; and the first short-circuit branch and the second short-circuit branch are symmetrical with each other with respect to the central axis, the first short-circuit branch is electrically connected to the feed main body and the first feed branch, and the second short-circuit branch is electrically connected to the feed main body and the second feed branch.

11. The antenna structure according to claim 10, wherein the feed main body comprises: a first feed main body and a second feed main body which are electrically connected sequentially, and the first feed branch and the second feed branch are symmetrically connected to two sides of the first feed main body with respect to the central axis;

the first branch further comprises: a third short-circuit branch, and the third short-circuit branch is on one side of the first feed branch close to the second feed main body;

the second branch further comprises: a fourth short-circuit branch; the fourth short-circuit branch is on one side of the second feed branch close to the second feed main body; and the third short-circuit branch and the fourth short-circuit branch are symmetrical with respect to the central axis, the third short-circuit branch is connected to the second feed main body and the first feed branch, and the fourth short-circuit branch is connected to the second feed main body and the second feed branch.

12. The antenna structure according to claim 11, wherein the second feed main body is electrically connected to the micro-strip, and a width of the first feed main body is greater than a width of the second feed main body.

13. The antenna structure according to claim 11, wherein an extension length of the first short-circuit branch is greater than an extension length of the third short-circuit branch.

14. The antenna structure according to claim 11, wherein the third short-circuit branch and the fourth short-circuit branch are L-shaped.

15. The antenna structure according to claim 10, wherein the first short-circuit branch and the second short-circuit branch are L-shaped.

16. The antenna structure according to claim 1, wherein the radiation patch further has a second slot, and the second slot is on one side of the first slot close to the micro-strip.

17. The antenna structure according to claim 16, wherein an extension direction of the second slot is parallel to an extension direction of the first slot, and a length of the second slot in the extension direction is less than a length of the first slot in the extension direction.

18. The antenna structure according to claim 1, wherein the radiation patch is connected to the ground layer through a short-circuit pin, and the short-circuit pin is close to the micro-strip.

19. The antenna structure according to claim 1, wherein orthographic projections of the radiation patch and the feed structure on the first dielectric substrate do not overlap with each other.

20. An electronic device, comprising the antenna structure according to claim 1.

* * * * *